(12) United States Patent
Kachhla

(10) Patent No.: US 10,644,942 B2
(45) Date of Patent: May 5, 2020

(54) MANAGEMENT OF RADIO UNITS IN CLOUD RADIO ACCESS NETWORKS

(71) Applicant: MAVENIR NETWORKS, INC., Richardson, TX (US)

(72) Inventor: Rasiklal M. Kachhla, Plano, TX (US)

(73) Assignee: MAVENIR NETWORKS, INC., Richardson, TX (US)

(*) Notice: Subject to any disclaimer, the term of this patent is extended or adjusted under 35 U.S.C. 154(b) by 0 days.

(21) Appl. No.: 16/269,969

(22) Filed: Feb. 7, 2019

(65) Prior Publication Data

US 2019/0245740 A1 Aug. 8, 2019

Related U.S. Application Data

(60) Provisional application No. 62/627,290, filed on Feb. 7, 2018.

(51) Int. Cl.

| | |
|---|---|
| *H04M 11/00* | (2006.01) |
| *H04L 12/24* | (2006.01) |
| *H04W 88/14* | (2009.01) |
| *G06F 8/65* | (2018.01) |
| *H04W 88/12* | (2009.01) |
| *H04L 12/26* | (2006.01) |

(52) U.S. Cl.
CPC .......... *H04L 41/082* (2013.01); *G06F 8/65* (2013.01); *H04L 41/04* (2013.01); *H04L 41/06* (2013.01); *H04L 41/0803* (2013.01); *H04W 88/12* (2013.01); *H04W 88/14* (2013.01); *H04L 43/10* (2013.01)

(58) Field of Classification Search
USPC ......... 455/403, 422.1, 424, 426.1, 418, 447; 370/328
See application file for complete search history.

(56) References Cited

U.S. PATENT DOCUMENTS

| | | | | |
|---|---|---|---|---|
| 9,258,629 | B2* | 2/2016 | Graves | H04Q 11/0005 |
| 2014/0031049 | A1* | 1/2014 | Sundaresan | H04W 16/02 |
| | | | | 455/447 |
| 2014/0161447 | A1* | 6/2014 | Graves | H04Q 11/0005 |
| | | | | 398/48 |
| 2015/0296392 | A1* | 10/2015 | Chen | H04W 16/00 |
| | | | | 370/328 |
| 2018/0007736 | A1* | 1/2018 | Ruttik | H04W 88/08 |

OTHER PUBLICATIONS

Third Generation Partnership Project (3GPP) (TR21.905): Technical Specification Group Services and System Aspects; Vocabulary for 3GPP Specifications (Release 14); V14.1. Jun. 2017.
Internet Engineering Task Force (IETF); Request for Comments: 6020: "YANG-A Data Modeling Language for the Network Configuration Protocol (NETCONF)", ISSN: 2070-1721; Oct. 2010.
Internet Engineering Task Force (IETF); Request for Comments: 6241:"Network Configuration Protocol (NETCONF)", ISSN: 2070-1721; Jun. 2011.

(Continued)

*Primary Examiner* — David Q Nguyen
(74) *Attorney, Agent, or Firm* — Ohlandt, Greeley, Ruggiero Perle, L.L.P.

(57) ABSTRACT

There is provided a system, method, and interfaces for Radio Access Networks and Cloud Radio Access Networks.

20 Claims, 27 Drawing Sheets

(56) References Cited

OTHER PUBLICATIONS

Internet Engineering Task Force (IETF); Request for Comments: 8071:"NETCONF Call Home and RESTCONF Call Home", ISSN: 2070-1721; Feb. 2017.
Common Public Radio Interface (CPRI) Specification V7.0; Interface Specification. Oct. 9, 2015.
xRAN-FH.MP. 0-v2.00 Technical Specification; "xRAN Fronthaul Working Group Management Plane Specification". Dec. 13, 2018.

\* cited by examiner

MANAGEMENT OF RADIO UNITS IN CLOUD RADIO ACCESS NETWORKS

CROSS REFERENCE TO RELATED APPLICATIONS

The present application claims foreign priority to U.S. Provisional Patent Application No. 62/627,290 filed on Feb. 7, 2018, the entirety of which is incorporated by reference hereby.

BACKGROUND OF THE DISCLOSURE a. Field of the Disclosure

The present disclosure relates to systems and methods for radio access networks. The present disclosure focuses on the design of operation, administration and management of various network elements of 4G and 5G based mobile networks.

a. Description of the Related Art

Traditionally, radio access networks (RAN) were built as an integrated unit where the management of various network elements was proprietary. Now RAN functions are being defined in standards and RAN functions are being split and distributed to different network entities. This brings in new problems of how these network entities are managed and how Operation Administration and Maintenance (OAM) functions can be implemented. Also, currently there is no consistent method to define various characteristics and attributes of the RAN network elements.

The present disclosure is in the field of operation, administration and management of Radio Access Network (RAN) and Cloud based Radio Access Network (C-RAN) network elements. The network elements are central unit (CU) also known as the baseband unit (BBU) located in the cloud on commercial off the shelf servers, where a significant portion of the RAN layer processing is performed; a distributed unit (DU), also referred as a Remote Radio Unit (RRU); and Remote Radio Heads (RRH), also referred as Transit Receive Points (TRPs). There are multiple configurations of the DU and the TRP. In some cases, RRU/RRH/TRPs integrated with DU are considered as integral part of the DU. In other cases, RRH/TRPs are separate network elements and can be supplied by different vendors and need to be managed as separate entities. In both cases, RRH/TRPs are considered as sibling child nodes of a parent DU and each parent RRH/DU can have multiple child node siblings.

Current no consistent method of management of these RAN network elements is defined.

In traditional LTE networks, the management of various network entities is proprietary and varied protocols and methods are used to for administration, operation, and management. There are multiple benefits of the embodiments described herein.

SUMMARY OF THE DISCLOSURE

The present disclosure provides embodiments that leverage various capabilities of Network Configuration Protocol (NETCONF) protocol and YANG data modelling language to provide flexibility of various management functions of RAN network entities.

The present disclosure also provides embodiments that use a standard NETCONF protocol for management. This protocol has been defined to support configuration and management of networks and devices. The NETCONF protocol provides mechanisms to install, manipulate, and delete the configuration of network devices. It uses an Extensible Markup Language (XML)-based data encoding for the configuration data as well as the protocol messages. The NETCONF protocol operations are realized as remote procedure calls (RPCs).

The present disclosure further provides embodiments that use a standard language YANG to define the data model of each RAN network entities. The YANG language is employed to define the characteristics and attributes of each of the RAN network entities. YANG is a data modeling language for the definition of data sent over the NETCONF network configuration protocol.

In an embodiment, the data model of the RRU can be configured as a separate entity from DU or can be an integrated entity of DU.

The present disclosure has embodiments that provide a simple and flexible approach to perform various operation and management functions by using the NETCONF protocol capabilities as well as YANG language use to define data model of each RAN network entity.

Management of DU and associated TRPs as described herein can also be used for the management of CUs and associated DUs.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference can be configured to be made to the following Detailed Description, which is to be read in association with the accompanying drawings.

FIG. 11 is a flowchart for an RRU activation sequence.

DETAILED DESCRIPTION OF THE EMBODIMENTS

Figure 1:
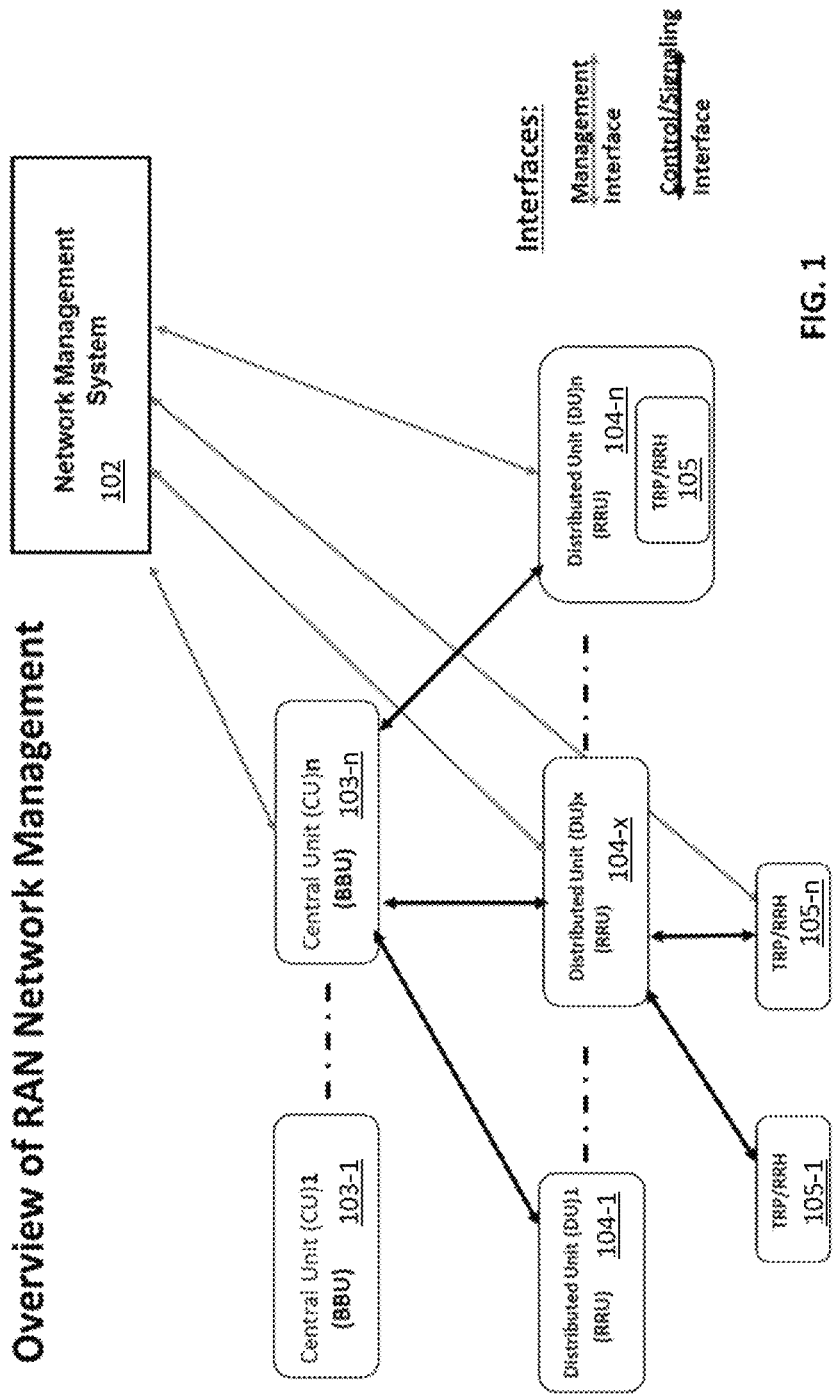
FIG. 1 is an example of a RAN system architecture and the management interfaces from the Network Management System to CUs, DUs and RRUs. It also shows the control and signaling interfaces for the Network Management System.

Reference is made to Third Generation Partnership Project (3GPP) and the Internet Engineering Task Force (IETF) in accordance with embodiments of the present disclosure. The present disclosure employs abbreviations, terms and technology defined in accord with Third Generation Partnership Project (3GPP) and/or Internet Engineering Task Force (IETF) technology standards and papers, including the following standards and definitions. 3GPP and IETF technical specifications (TS), standards (including proposed standards, technical reports (TR) and other papers are incorporated by reference in their entirety hereby, define the related terms and architecture reference models that follow.

Abbreviations

3GPP: Third generation partnership project
CAS: Centralized Analytics System
C-RAN: cloud radio access network.
CM: Configuration Management
CU: Central unit or Control Unit
CEM: Centralized Element Management System
CPRI: Common Public Radio Interface
DU: Distributed unit
DHCP: Dynamic Host Configuration Protocol
DNS: Domain Name Server
eNB Central Unit (eNB-CU)
eNB Distributed Unit (eNB-DU)
FQDN: Fully Qualified Domain Name
FM: Fault Management
KPI: Key Performance Indicator
LTE: long term evolution
LTE-A: LTE Advanced
MAC: Medium Access Control
MEC: Mobile Edge Computing
NETCONF: Network Configuration Protocol
NMS: Network Management System
OAM: Operation Administration and Maintenance
OCP: ORI Control and Management Protocol
PM: Performance Management
RAN: Radio Access Networks
RRH: Remote Radio Heads
RRU: Remote radio unit.
SDM: Smart Deployment Manager
SON: Self-Optimization Network
S/W Management: Software Management
TRP(s): Transit Received Point(s)
UE: user equipment
vBBU: Virtualized baseband unit
YANG: YANG Data Modeling Language

Definitions

Network Management System (NMS) and Centralized Element Management System (CEM): NMS provides Fault, Configuration, Accounting, Performance and Security (FCAPS) management of the Mavenir VNFs, Support elements including PNFs/RRU and Third Party RRUs via CPRI Adapter. In embodiments described herein, the NMS comprises at CEM and a Smart Deployment Manager SDM, however the NMS can be a single component as well.

Cloud RAN: Refers to Radio Access Network solution that consists of Virtual Control Unit (CU), Distributed Unit (DU), Remote radio Unit (RRU), Centralized Element Management Systems (CEM) and Self Organizing Networks (SON) designed for E-UTRAN and NR access.

eNB Central Unit (eNB-CU): A logical node that includes depending on the functional split option the eNB functions like transfer of user data, mobility control, radio access network sharing, session Management and the like, except those functions allocated exclusively to the DU. CU controls the operation of DUs over front-haul or Midhaul interface (F1).

eNB Distributed Unit (eNB-DU): This logical node includes a subset of the eNB functions, depending on the functional split option. Its operation is controlled by the CU. Distributed Unit (DU) also known with other names like RRH/RRU/RE/RU.

Remote Radio Unit (RRU): Refers to a lightweight pole or wall mountable outdoor RRU supporting E-UTRAN and/or NR access or UTRAN, NR access, and/or Wi-Fi Access.

The present disclosure provides embodiments of systems, devices and methods for Radio Access Networks and Cloud Radio Access Networks.

Embodiments cover the interface between Network Management System and Remote Radio Units (RRU). In a 5G network, RRUs are also referred as Distributed Units (DUs), the terms being used interchangeably herein.

Embodiments associated with RRUs are the Remote Radio Heads (RRH) or Transmit Receive Points (TRPs) deployed on sites.

Embodiments cover small cells and macro cells.

Embodiments as described herein support LTE and 5G systems.

FIG. 1 illustrates an example of a RAN system architecture and the management interfaces from the Network Management System to CUs 103-1, 103-*n*, DUs 104-1, 104-*x*, 104-*n* and RRUs 105-1, 105*n* TRPs. It also shows the control and signaling interfaces for the Network Management System. Embodiments can be employed on an interface between a Network Management System and CUs 103-1, 103-*n*, for example, in virtualized baseband units (vBBUs). A vBBU is a Central Unit 103 as deployed, for example, in a 5G network. A vBBU CU 103 is deployed in the cloud.

Figure 2:
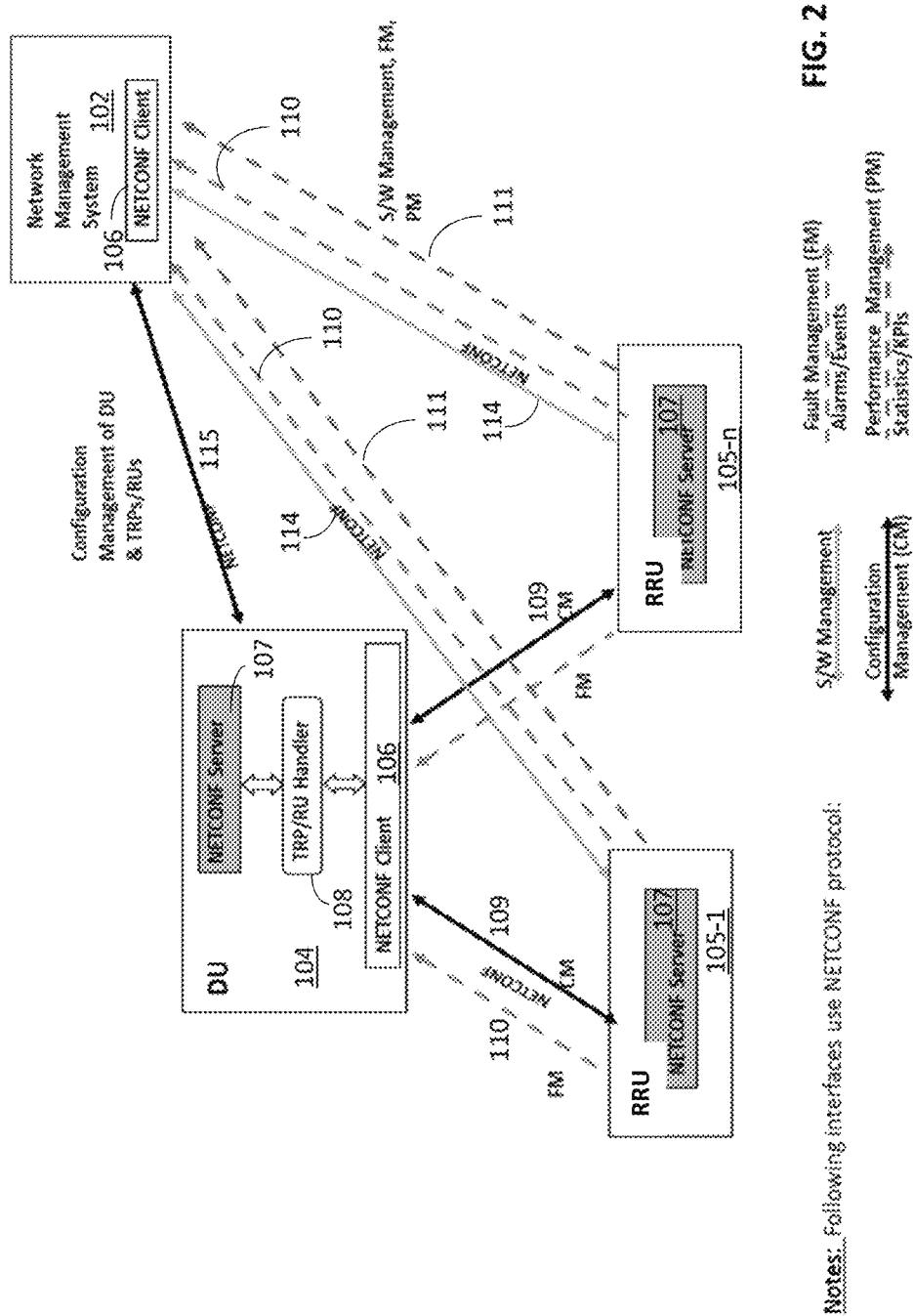
FIG. 2 is an embodiment of a system architecture of incorporating the TRP/RRHs as siblings of DU/RRU for configuration management of DU and associated TRPs. It also shows the control and signaling interfaces.

FIG. 2 illustrates embodiments of a system architecture of incorporating the TRP/RRH RRUs 105 child nodes as siblings of DU 104 for configuration management of DU 104 and associated RRU 105-1, 105-*n* TRPs. There can be one or more RRUs 105-1, 105-*n* that provide the radio part of service and that are controlled by parent DU 104. This includes configuring and controlling the transmission power and various configurations of the TRPs. As shown in the embodiment of FIG. 2, NETCONF server 107 and NETCONF client functions 106 are introduced in the DU 104, which allows the DU 104 to be managed using NETCONF protocol on the north bound interface 115 to the Network Management System 102 as well as southbound interface 109 from DU to its associated RRU 105-1, 105-n TRPs/RRHs. In the configuration of this embodiment, the RRU 105 TRPs/RRH considers the DU 104 NETCONF Client 106 interface 109 as an interface to Network Management System 102, although the interface is via DU 104.

Figure 3:
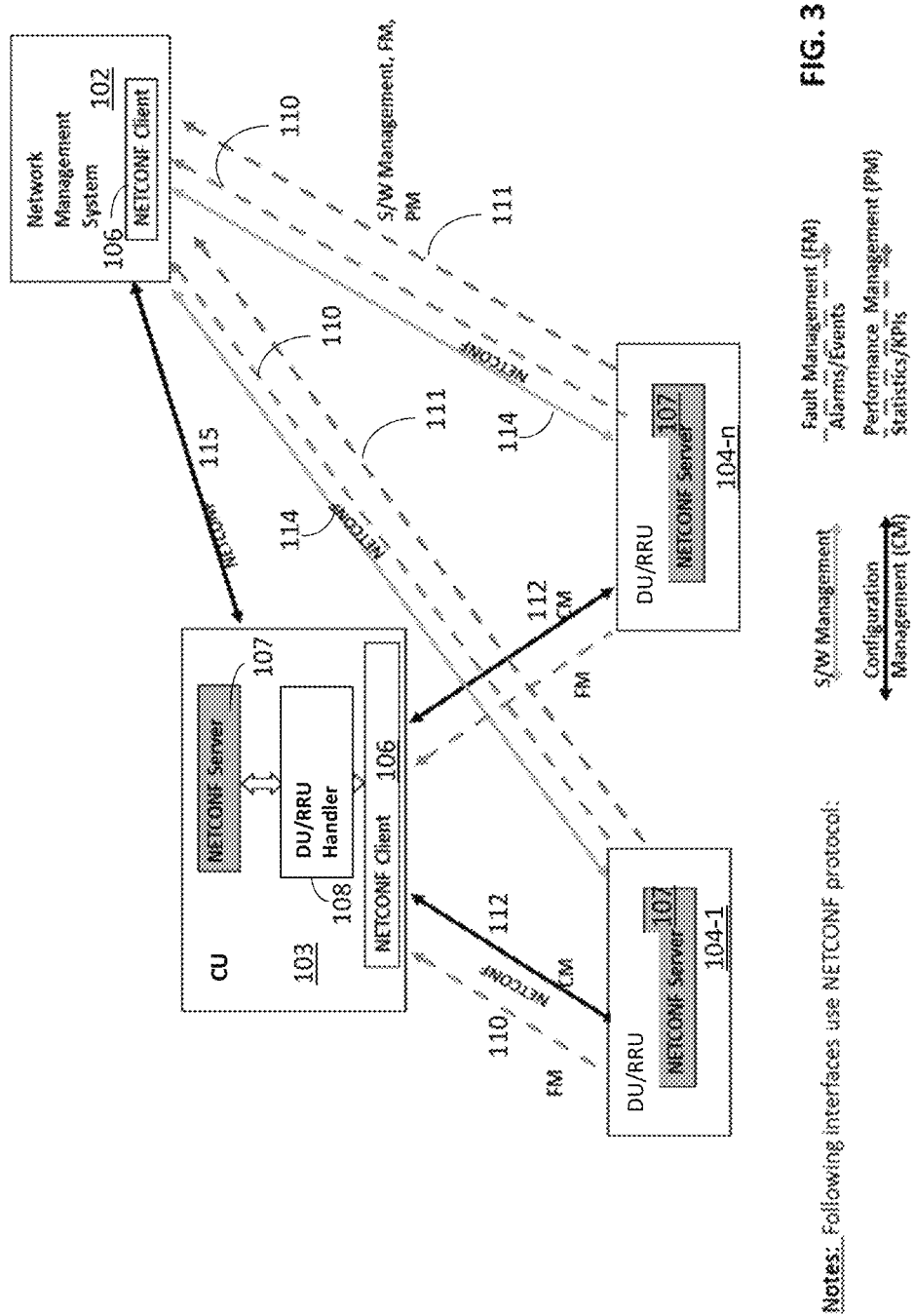
FIG. 3 is an embodiment of a system architecture of incorporating the DU/RRUs as siblings of CU for configuration management of DU. It also shows the control and signaling interfaces.

FIG. 3 illustrates an embodiment of a NETCONF server 107 and NETCONF client functions 106 introduced in the CU 103, which allows the CU 103 to be managed using NETCONF protocol on the north bound interface 115 to the Network Management System 102 as well as a southbound interface 112 from CU to associated DU/RRUs 104-1, 104-n. In the configuration of this embodiment, the DU/RRU 104 considers the CU 103 NETCONF Client 106 interface 112 as an interface to Network Management System 102, although the interface is via CU 103.

The functions and modules are described above with respect the embodiments of FIGS. 1-2 can be configured to operate in the same manner with respect to FIG. 3. Again, as can be configured to be appreciated, each of the CUs 103-1, 103-n and DU/RRUs 104-1, 104-x, 104-n of FIG. 1 can be configured as shown in DDU/RRU 104 of FIG. 2 and the CU as shown in FIG. 3, thereby configuring the DDU/RRUs 104-1, 104-n, and RRU 105, 105-1, 105n, and CUs 103-1, 103n as siblings with respect to the Network Management System 102 and enabling the communications and features as described herein.

Configuration Management:

In one aspect of an embodiment as shown in FIG. 2, configuration management allows TRPs/RRHs for RRUs 105-1, 105n to be configured by Network Management System NMS 102 via the DU 104 or directly from Network Management System NMS 102. An exemplary advantage of configuring the RRUs 105-1 105-n TRPs via the DU 104 is that the DU 104 is configured to receive and store information about of the capabilities, characteristics and attributes of the associated RRUs 105 105-1, 105-n TRPs/RRHs, which are associated with it. Also, since any subsequent configuration changes are done via the parent the DU 104. The DU 104 can be configured to be aware of these changes as well as any configuration changes which failed to be completed on the TRPs/RRHs of the RRUs 105-1, 105n. This is achieved by using NETCONF server 107, NETCONF client 106 and TRP Handler OAM modules 108 in the DU 104. TRPs of RRUs 105-n can be embedded within a DU 104 or can be configured as separate entities from the DU 104 and connected over an IP network and configured using NETCONF protocol.

In an embodiment, the YANG data model language is employed to incorporate dependent data model of TRPs of RRUs 105-1, 105-n as part of a DU's data model. This allows the configuration management of dependent RRUs 105-1, 105-n TRPs to be handled by the DU 104 such that the DU 104 can be aware of all configuration of changes, including any failures in configuration changes, e.g., from fault messages 110.

The configuration management above allows the DU 104 to pre-process any actions or operations to be performed on the RRUs 105-1, 105-n before forwarding the action/operation to affected RRU.

Configuration Management from NMS 102 is via the DU 104. The DU 104 also obtains all the configuration information about the RRU 105 that is associated with each CPRI adapter. Northbound interface from the DU 104 to the NMS 102 is a NETCONF interface.

Fault Management:

In an embodiment, a NETCONF Event Notification feature comprises a Fault Management Interface 110 configured to allow the alarm/events to be reported from the NETCONF server 107 on the RRU 105-1, 105-n TRPs to multiple north bound entities, for example, the DU 104 and Network Management System 102. In this case of the DU 104 and associated RRUs 105-1, 105-n, Network Management System 102 server subscribes to a stream of all the Alarms and Events from TRPs 105-1, 105-n, while the DU 104 is configured such that it is capable of subscribing to selected stream of Alarms and Events via the FM interface 110 so it can take appropriate action for the interested alarms/events.

Faults and Alarms reported by CPRI Adapter are handled via DU 104 and to take any action on the alarms and forwarded to CEM 103.

Faults and Alarms reported by RRU 105-n are sent to CEM. For any alarms that DU 104 is interested and need to react to, DU 104 can be configured to subscribe to the alarm Notification stream on via NETCONF interface 109 to RRU 105.

Statistics/Performance Management:

In the embodiment as described with respect to FIG. 2, statistics and KPI counters are reported via a Performance Management Interface 111 directly from TRPs 105-1, 105-n to Network Management System 102, however this does not preclude embodiments to send statistics or any events associated with the statistics to be reported from RRU 105-1, 105-n to the DU 104 (not shown).

Statistics and KPI files are pushed to specified file server. Depending on IP network deployment scenario, If a Third Party RRU 105 does not have direct IP connectivity to file server, an IP routing/forwarding function can be provided at the DU 104.

Software Management:

In the embodiment as described with respect to FIG. 2, any software upgrade of RRU 105-1, 105-2 can be done directly from Network Management System 102, including any application of software patches, for example via Software Management Interface 114.

Embodiments as described herein address the challenges management of various RAN network entities. As shown in FIG. 2, embodiments are configured to use features available in NETCONF protocol and YANG data language to implement various operation, administration and management functions. There are multiple ways in which the RAN network entities are managed in the network. Some aspects of systems and methods to which the present disclosure is directed include:

1. Use of NETCONF Server 107 and NETCONF Client 106 in different ways or in combination in Network Management System 102, the DUs 104-1, 104-n and RRUs 105-1, 105-n for management of the RAN entities. In case of the DU 104, both NETCONF Server 107 and client 106 are configured with a TRP handler function OAM module 108 to handle NETCONF messages from the north bound interface 108 of Network Management System NMS 02, and the send responses to it. Also, in this configuration the TRP handler OAM module 108 of the parent DU 104 processes NETCONF messages to the dependent RRUs 105-1, 105-n and handles the responses including failure responses from TRPs 105-1, 105-n. The RRUs 105-1, 105-n can include OAM module 108 for messaging with the DU 104.

2. YANG language and features are used to define dependent or associated sibling nodes of the DU 104.

3. NETCONF Event Notification feature is used to subscribe to streams of alarms/events from the NETCONF server in the RRU 105-*n* TRP. Network Management System NMS 102 uses NETCONF to create-subscription method to interested Alarms/Events, while the DU 104 uses NETCONF create-subscription by specifying the subset of alarm messages the DU 104 is interested in receiving. Streams of alarms/events are grouped appropriately into one or more steams.

For software management, firmware can be downloaded to an RRU 105 based on the URL location provided to RRU.

Statistics and KPI files are pushed to a file server 116 from RRU 105.

Table 1 shows an XRAN RRU YANG Module Data Architecture.

TABLE 1

| SYSTEM | OPERATIONS | INTERFACES | RADIO | SYNC |
|---|---|---|---|---|
| Xran-alarm-id.yang | Xran-troubleshooting.yang | Xran-interfaces.yang | Xran-delay-management.yang | Xran-sync.yang |
| Xran-hardware.yang | Xran-ecpri-delay.yang | Xran-processing-elements.yang | Xran-module-cap.yang | |
| Xran-supervision.yang | Xran-file-management.yang | Xran-tranceiver.yang | Xran-beamforming.yang | |
| Xran-fm.yang | Xran-lbm.yang | Xran-mplane-int.yang | | |
| Xran-fan.yang | Xran-operations.yang | Xran-externalio.yang | | |
| Xran-usermgmt.yang | Xran-performance-management.yang | Xran-dhcp.yang | | |
| | Xran-software-management.yang | Xran-ald-port.yang | | |
| | Xran-udp-echo.yang | | | |
| | Xran-uplane-conf. yang | | | |
| | Xran-ald.yang | | | |

Figure 4A:
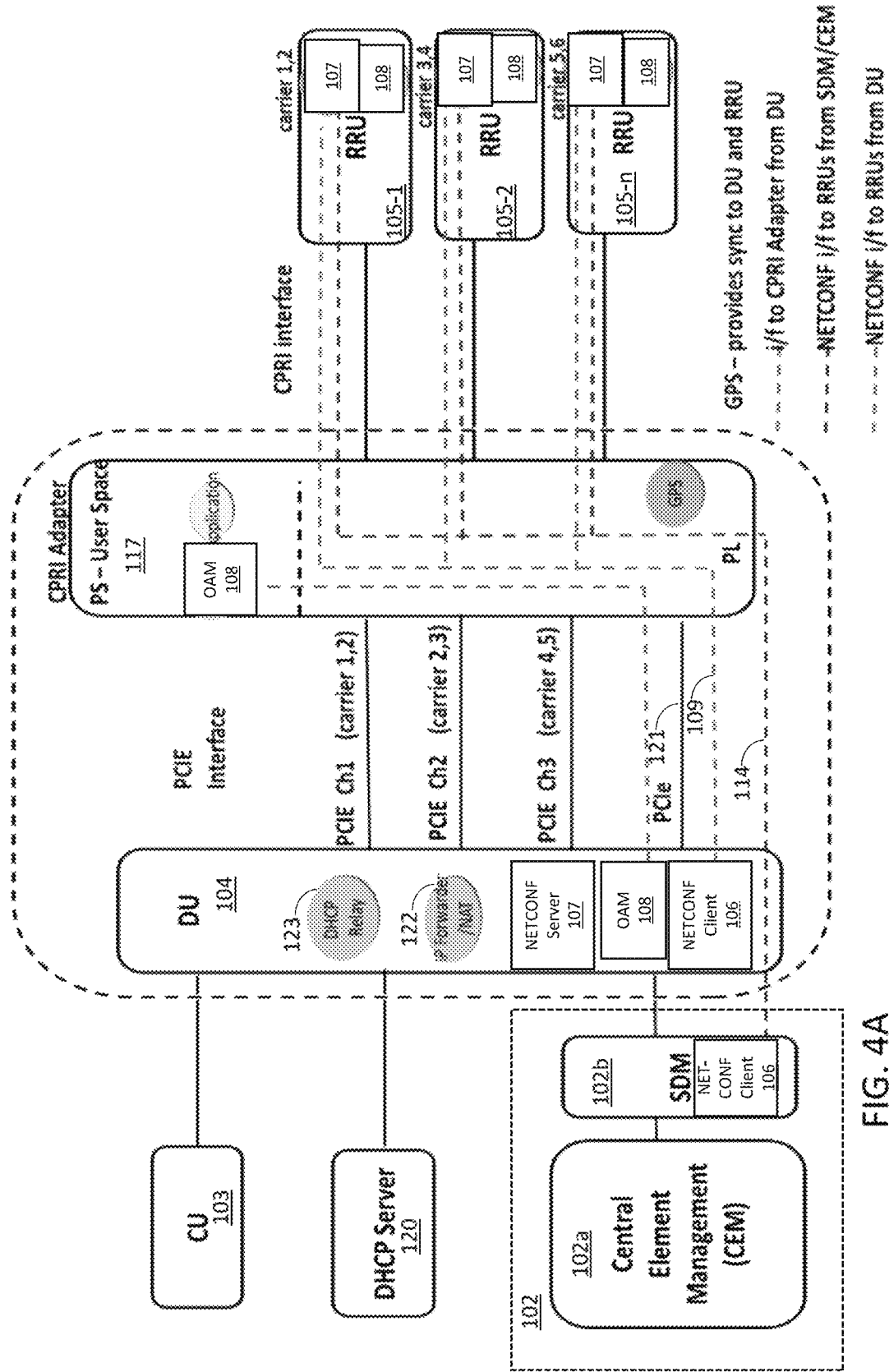
FIGS. 4A-4B and FIGS. 5A-5B is an embodiment of a high level architecture for OAM connectivity and interface to RRUs from DU with a CPRI Adapter using a PCIe interface.
Figure 4B:
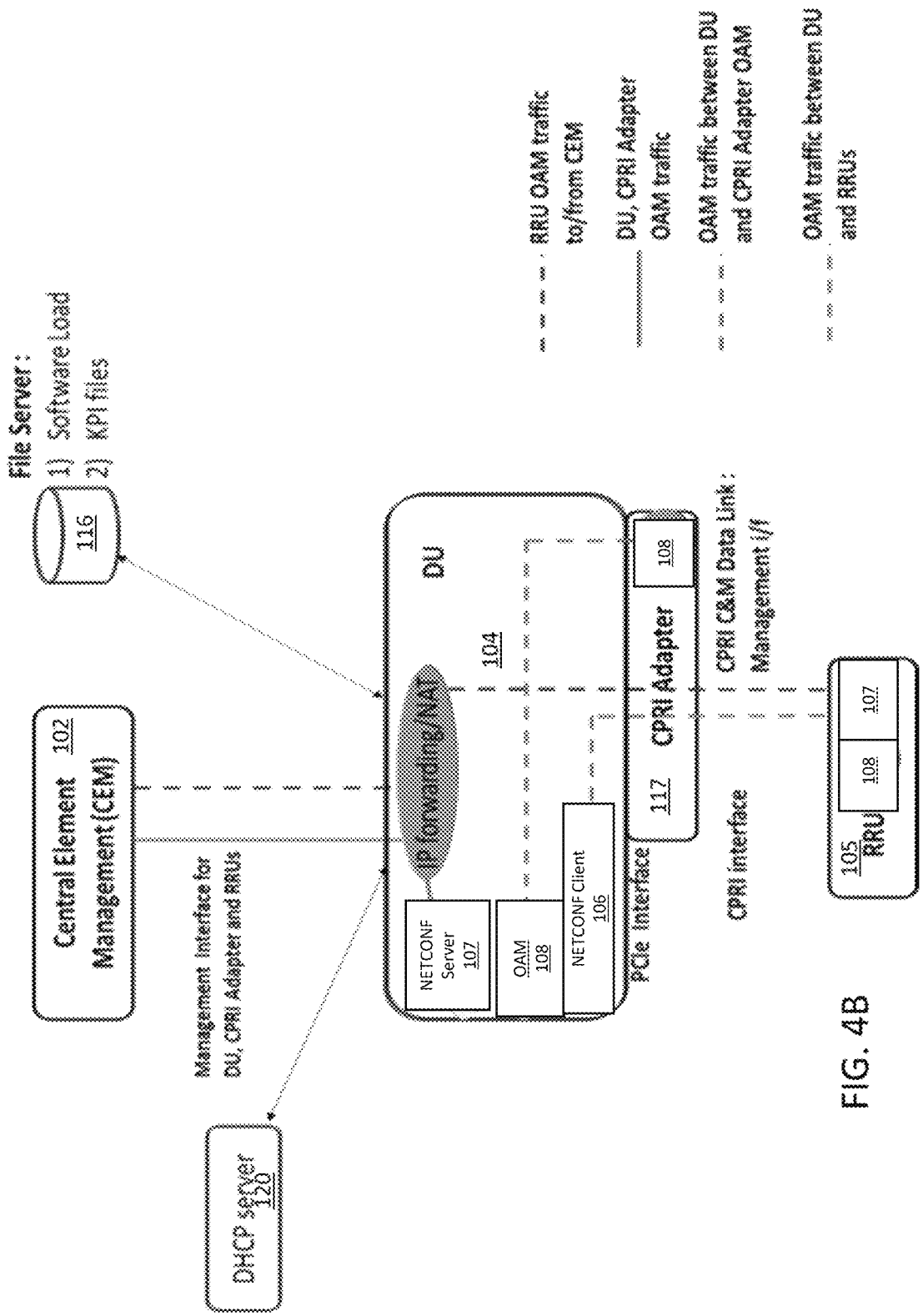
Figure 5A:
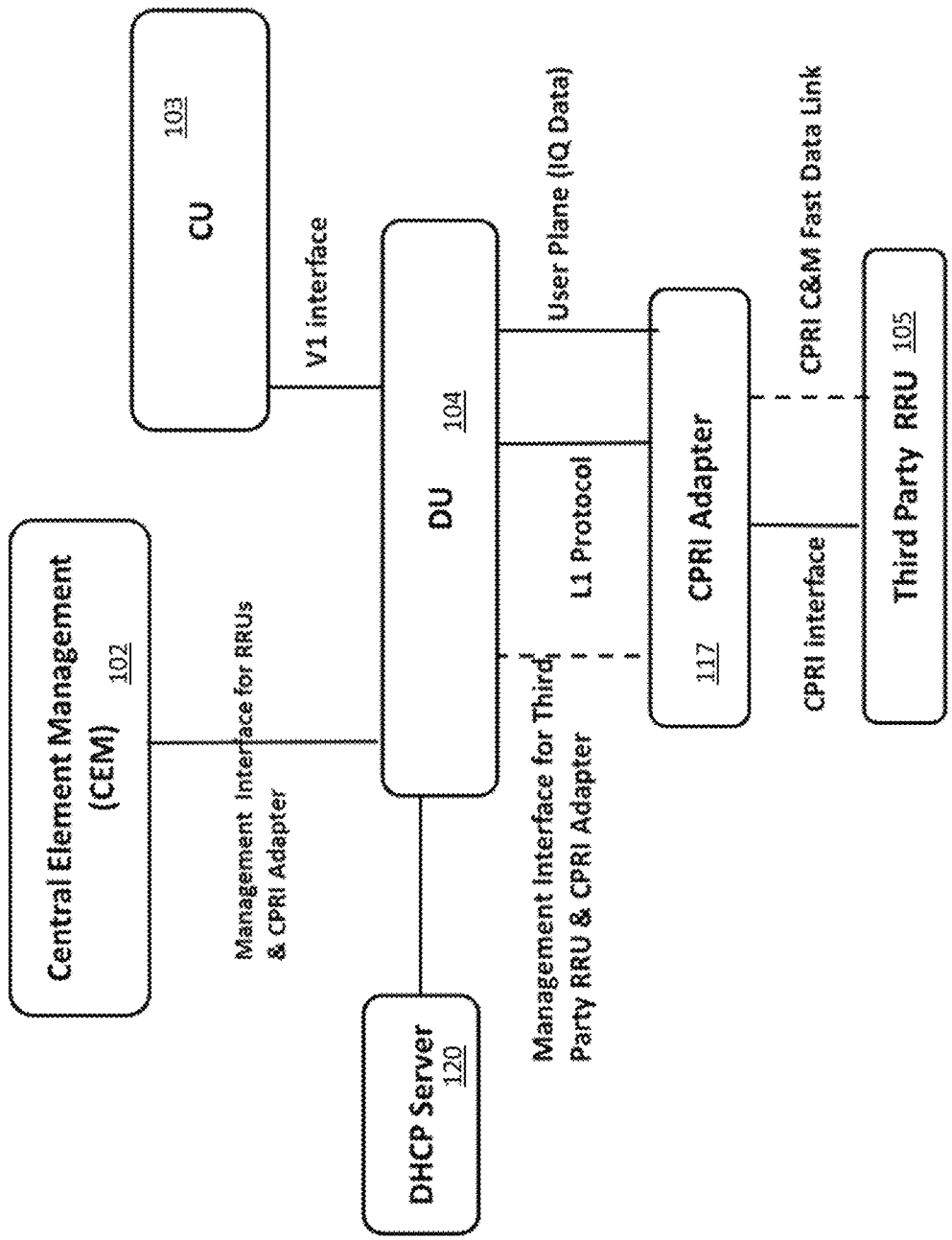
Figure 5B:
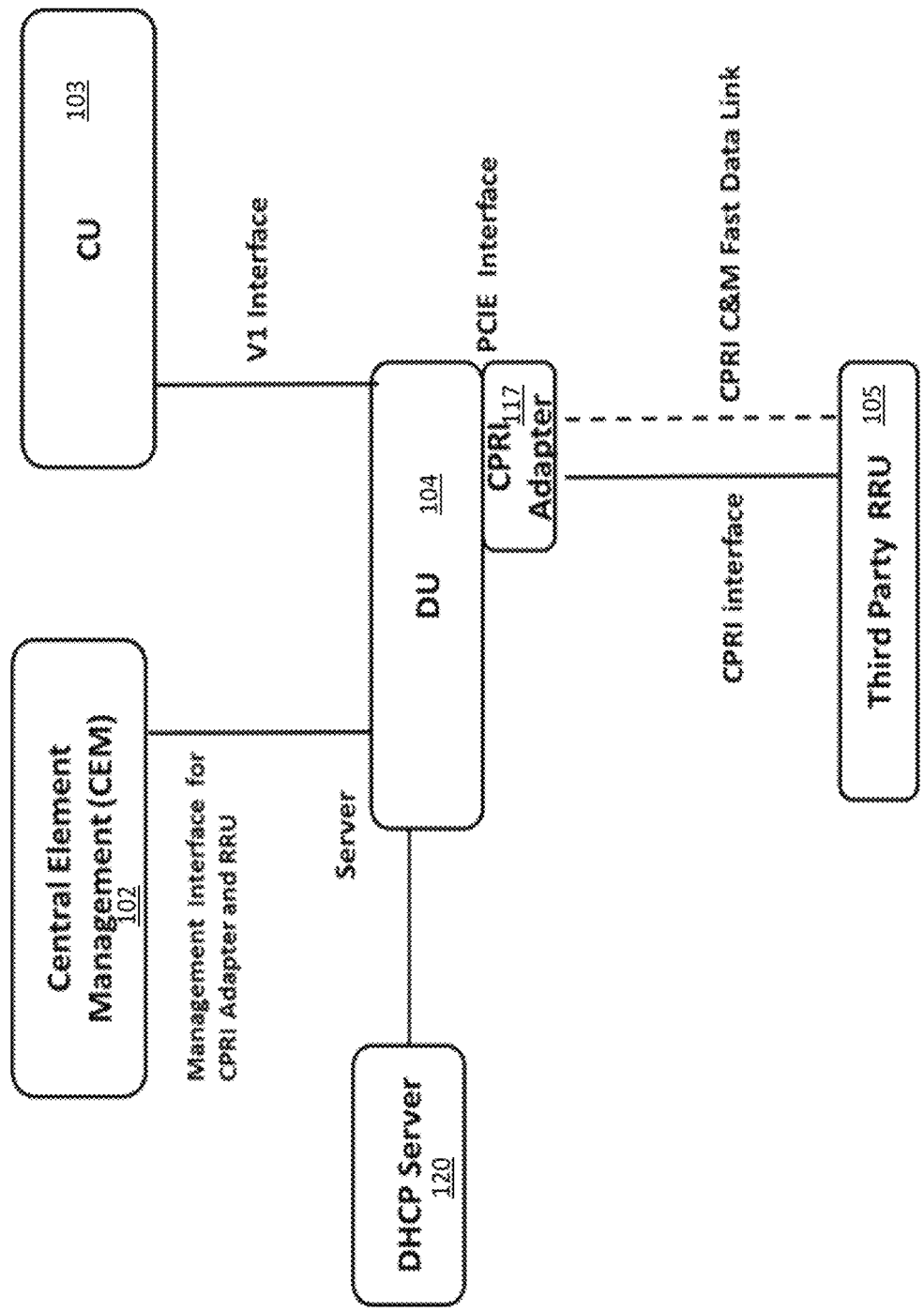

FIGS. 4A-4B illustrate an embodiment for a high-level architecture for OAM module 108 connectivity and interface to the RRUs 105-1, 105-*n* from DU 104 with a CPRI Adapter using a PCIe interface.

In an embodiment, the NMS includes a CEM 102*a* and SDM 102*b*. Configuration Management from CEM 102*a* is via the DU 104. DU 104 also requires all the configuration information about each RRU 105-1-105*n* that is associated with a CPRI adapter 117. A northbound interface from the DU 104 is a NETCONF client server interface 107 to CEM 102*a*, shown as via a NETCONF client 106 at an SDM 101.

Faults and Alarms reported by CPRI Adapter are handled via DU 104 to take any action on the alarms and forwarded to CEM 102*a*. Faults and Alarms reported by RRU 105 are sent to CEM 102*a*. For any alarms that DU 104 is interested in and needs to react to, DU 104 can be configured to subscribe to an alarm Notification stream.

For Software Management, firmware can be downloaded to RRU 105 based on a URL location provided to RRU. Statistics and KPI files are pushed to a file server 116.

Depending on IP network deployment configurations, if an RRU 105 does not have direct IP connectivity to file server, IP routing/forwarding function can be required at DU 104.

In embodiments as described herein, the RRUs 105*n* support XRAN M-Plane specifications, including those identified and incorporated by reference herein, which include support for NETCONF interface and basic YANG models specified by XRAN Management Plane specifications.

Described herein are requirements to interface and manage the RRUs 105*n* via a CPRI adapter. The DU 104 has an PCIe interface to the CPRI Adapter and the OAM module 108 in DU 104 provide a management interface for CPRI adapter and the CPRI links to the RRUs 105*n*.

Capacity Requirements

Each CPRI Adapter can be configured manage up to three RRUs 105*n*. A maximum number of the RRUs 105*n* supported can depend on the capabilities and throughput of individual RRU.

Constraints and Limitations

In an embodiment, each RRU 105-*n* can be connected to a CPRI Adapter 117 can be from a same vendor and have the same capabilities. Support for vLAN configuration can be configured.

DU OAM Proxy Functions

In an embodiment, the following OAM module 108 functions can be required on the DU for management of CPRI adapter 117 and the RRU 105 to address connectivity between DU 104, CRPI Adapter 117 and the RRU 105 with reference to routing IP traffic over a PCIe interface (requirement to support Ethernet driver over PCIe).

DU provides IP forwarding or Network Address Translation (NAT) 122 functions depending on the deployment scenario for the RRUs 105-*n* and how IP addresses are allocated for the RRUs 105-*n*. OAM module 108 IP traffic destined for an RRU 105 can be configured to be forwarded to an RRU 105 while IP traffic destined for a DU 104 can be routed locally to DU 104, and OAM module 108 IP traffic destined for CPRI Adapter 117 is routed to a CPRI Adapter 117.

The DU 104 is configured to react to certain alarms from RRU 105. Support for the hybrid M-Plane architecture is as defined by XRAN M-plane specification operational requirements as described in XRAN Management Specification, 2018.07.13-XRAN-FH.MP.2.0, the entirety of which is incorporated by reference hereby. The DU 104 is configured to support a NETCONF interface 109 to the RRU, and the CEM is configured to support the NETCONF interface 114 to RRU.

An OAM module 108 on the DU 104 is configured to interface with the OAM module 108 on the CPRI adapter for configuration and operation of a CPRI adapter 117 and CPRI links. In an initial phase, a static configuration can be used and initial configuration of the CPRI adapter and CPRI links can be provided via a file. Faults and Alarms reported by CPRI Adapter can be handled via the OAM module 108 on the DU 104 and can be configured to take any action on the alarms and forwarded to CEM. The OAM module 108 on the DU 104 can be configured to interface with CPRI Adapter 117 OAM module 108 and notify CEM 102a for any operational state changes.

The OAM module 108 on the DU 104 is configured to register/subscribe via a NETCONF interface 114 with the RRUs 105-n for any alarm stream that the DU 104 needs to react. The OAM module 108 in the DU 104 is configured to forward this subset of alarms to an L2 application on the DU 104 and are forwarded to CU over a V1 interface.

Interface and Functional Requirements

In an embodiment, the DU 104 can be configured to provide interface 109 to the RRUs 105-n associated with each CPRI link on CPRI Adapter 117. This includes providing IP forwarding/IP routing function for the RRUs 105-n associated with each CPRI link as well as the CRPI adapter. The DU 104 can be configured to allow routing of packets between CEM 102a and the RRUs 105-n as well as CPRI Adapter 117.

In an embodiment, each CPRI adapter 117 can be configured to support at least three RRUs 105-1, 105-2, 105-n.

In an embodiment, each DU 104 can be configured to support at least three RRUs 105-1, 105-2, 105-n via a PCIe interface 121.

In an embodiment, the DU 104 can be configured to provide a DHCP relay 124 function for providing IP connectivity to a DHCP server for the CPRI Adapter as well as the RRUs 105-n associated with the CPRI Adapter 117.

In an embodiment, CEM 102a can be configured to support NETCONF interface to The OAM module 108 on the DU 104. The OAM module 108 on the DU 104 can be configured to interface with The OAM module 108s on CPRI Adapters 117 via a PCIE interface 121.

In an embodiment, CEM can be configured to have management interface to NETCONF Server and The OAM modules 108 on the RRUs 105-n using NETCONF. NETCONF packets can be configured to be routed from CEM/SDM to the DU 104 where an IP forwarding function can be configured to forward the packets to RRU. In an embodiment, Ethernet link over PCI interface 121 can be supported.

In an embodiment, CEM 102a can be configured to provide configuration management, fault management, performance management and software management functions for the CPRI Adapter 117 via OAM 108 on the DU 104 interworking with the OAM module 108 on CPRI Adapter 117.

In an embodiment, CEM 102a can be configured to provide configuration management, fault management, performance management and software management functions for the RRUs 105-n associated with the CPRI Adapter 117.

In an embodiment, the DU 104 can be configured to perform periodic heartbeat/supervision of each RRU 105-n associated with CPRI Adapter 117 after the RRUs 105-n are enabled and brought into service. The heartbeat timer to the RRUs 105-n can be configurable with a default of 10 seconds.

In an embodiment, if the RRU 105-n fails to respond to heartbeat for a configured threshold, the DU 104 can be configured to report or raise a supervision failure alarm for an affected RRU 105-n and initiate a reset of the affected RRU.

CPRI adapter 117 is associated with the DU 104 since CPRI adapter 117 is a card in the DU 104. CEM can be configured to obtain this information from the DU 104 inventory data during pre-provision of the DU 104 and inventory data should include CPRI adapter serial number.

The OAM module 108 on the DU 104 can be configured to interface with the OAM/module 108 on CPRI adapter to get notified of operational and alarm state changes of CPRI adapter 117 as well as CPRI links and send NETCONF notifications to the NMS 102 CEM/SDM. The OAM module 108 can be configured to also notify applications on the DU 104.

CPRI Adapter Configuration

In an embodiment, at an initial phase, a static fixed configuration can be used for a CPRI Adapter 117. In another embodiment, a dynamic configuration can be supported. For static fixed configurations, a configuration change can require restart of CPRI Adapter until dynamic configuration is supported. The NMS 102 CEM/SDM can be configured to interface with the OAM module 108 on the DU 104. The OAM 108 on the DU 104 can be configured to interwork with the OAM module 108 on the CPRI adapter 117 via the CPRI Adapter 117.

CEM 102a can be configured to support following CPRI Adapter 117 configuration:
a) CPRI Adapter configuration.
b) CPRI interface configuration, supporting 3 SFP ports for the CPRI links.
c) CPRI IQ mapping scheme. This is determined during pre-staging/pre-provisioning based on the RRU 105n capabilities and CPRI Line Rate.
d) Delay adjustment

TABLE 2

| CPRI Adapter attributes | | | | |
|---|---|---|---|---|
| Object/Attribute Name | Type | Default value | Min, Max Values | Notes |
| CPRI adapter hardware attributes | | | | Include ietf-hardware.yang for CPRI adapter configuration and operation attributes. At minimum following should be supported: Hardware, Component, admin-state, name, hardware-rev, firmware-rev, software-rev, serial-num, state, and notifications |
| Number of CPRI SFP ports | Uint8 | 3 | 1, 3 | Default 3, Support 3 CPRI links per adapter card per DU |

TABLE 2-continued

CPRI Adapter attributes

| Object/Attribute Name | Type | Default value | Min, Max Values | Notes |
|---|---|---|---|---|
| Max-sectors-per-RRU | eint8 | 1 | 1, 2 | Each RRU can support multiple sectors, each sector can be used by different customer i.e. customer A can use one sector, customer B can use second sector |
| For each CPRI Port | | | | |
| >>CPRI line rate | enum | Line rate 5 | 3, 5, 7 | Line Rate 3 (2,457.6 Mb/s) Line Rate 5 (4,915.2 Mb/s) Line Rate 7 (9830.0 Mb/s) |
| >>Number of Transmit and Receive Antenna ports | Uint8 | 2 | 2-8 | Number of transmit and receive antennas per RRU. In initial phase 2T2R RRU can be supported |
| >>CPRI IQ Mapping Scheme | enum | IQ_Mapping_Scheme_packed_method1 | | Two methods are specified IQ_Mapping_Scheme_packed_method1 (Each AxC Container in a basic frame is sent consecutively (without any reserved bits in between) and in ascending order of AxC number) IQ_Mapping_scheme_flexible_method3 (flexible position) |
| >>RRU connection | Enum | point-to-point | point-to-point, daisy-chained | RRUs can be connected point to point or daisy-chained. |
| >> Delay Adjustment | nano-seconds | 4 | nano-second | Uplink frame alignment with downlink frame per CPRI port |
| >> max-bandwidth-ul | Uint64 | 18.3 | Mbps | Max UL would depend on the following: 64 QAM or 256 QAM Based on bandwidth: 5 Mhz, 10 Mhz, 20 Mhz Default values are for 5 Mhz, 64 QAM, 2T2R |
| >> max-bandwidth-dl | Uint64 | 36.7 | Mbps | Max UL would depend on the following: 64 QAM or 256 QAM Based on bandwidth: 5 Mhz, 10 Mhz, 20 Mhz Default values are for 5 Mhz, 64 QAM, 2T2R |
| CPRI Adapter CPRI Timeslot Configuration for TX and RX for each RRU supported/CPRI Port | | | | For 2T2R antenna configuration following are the configuration 5 Mhz: First AxC in timeslots 0, 2, 4, 6 10 Mhz: First AxC in timeslots 0, 4, 8, 12 10 Mhz: First AxC in timeslots 0, 8, 16, 24 Note: these cpri timeslots apply for transmit and receive |
| >>timeslot-for-first-AxC1 | Uint8 | 0 | 0-24 | Valid time slots 0, 2, 4, 6, 8, 10, 12, 14, 16, 24 Timeslot used for first sector/cell |
| >>timeslot-for-first-AxC2 | Uint8 | 2 | 0-24 | Valid time slots 0, 2, 4, 6, 8, 10, 12, 14, 16, 24 Timeslot used for first sector/cell |
| >> timeslot-for-first-AxC3 | Uint8 | 4 | 0-24 | Valid time slots 0, 2, 4, 6, 8, 10, 12, 14, 16, 24 Timeslot used for second sector/cell |
| >> timeslot-for-first-AxC4 | Uint8 | 6 | 0-24 | Valid time slots 0, 2, 4, 6, 8, 10, 12, 14, 16, 24 Timeslot used for second sector/cell |

The attributes shown in Table 2 can be defined using YANG modules (see Table 1), and default values can be assigned in an initial phase.

Initial configuration file(s) can be created during pre-provisioning for CPRI Adapter 117 based on YANG modules defined for above attributes shown in Table 2 and downloaded to the DU 104 during startup of the DU 104.

The OAM module 108 on the DU 104 can be configured to interwork with the OAM module 108 on the CPRI Adapter to configure the CPRI adapter during DU startup.

The OAM module 108 on CPRI Adapter 117 can configure the CPRI interface to each RRU 105-n based on an initial CPRI adapter configuration file provided during startup of DU from CEM.

During bootup of the DU 104, the DU 104 can be configured to also provide the inventory information of the CPRI Adapter 117 to CEM 102a during registration of the DU 104 at CEM 102a. The CPRI adapter inventory information can be configured to include CPRI Adapter 117 serial number, mfg-name, uuid and other hardware attributes including the operational state of each CPRI link.

RRU Configuration

The following static configuration can be used to configure the RRU 105-n. In an embodiment, this procedure can used in the initial phase until third party RRUs 105-n can support an XRAN M-Plane interface without the CPRI Adapter 117. In an embodiment, a dynamic configuration can be employed. A configuration change can require restart of the RRU 105 after configuration change. Certain changes in the RRU 105 can also require corresponding changes in CPRI Adapter 117 configuration which includes changes to following attributes:

i. Number of CPRI SFP ports
ii. Attributes related to each port:
 a. CPRI line rate—can be configured to match with line rate on CPRI link to RRU 105
 b. Number of Transmit and Receive Antenna ports—can be configured to match with the RRU 105 Transmit & Receive ports
 c. CPRI IQ Mapping Scheme—can be configured with same setting on CPRI link at RRU 105.
iii. Some RRUs may not have support for GPS. In this case location information (latitude and longitude) can be provided to RRU after initial bootup sequence of RRU.

The following configurations can be supported for RRUs 105.

Radio Capabilities

TABLE 3

Radio Capabilities attributes

| Object | Attribute Name | Notes |
|---|---|---|
| Radio Capabilities | max-supported-frequency-dl | Refer to XRAN YANG modules for details (Table 1) |
| | min-supported-frequency-dl | Refer to XRAN YANG modules for details (Table 1) |
| | max-supported-bandwidth-dl | Refer to XRAN YANG modules for details (Table 1) |
| | max-num-carriers-dl | Refer to XRAN YANG modules for details (Table 1) |
| | max-carrier-bandwidth-dl | Refer to XRAN YANG modules for details (Table 1) |
| | max-supported-frequency-ul | Refer to XRAN YANG modules for details (Table 1) |
| | min-supported-frequency-ul | Refer to XRAN YANG modules for details (Table 1) |
| | max-supported-bandwidth-ul | Refer to XRAN YANG modules for details (Table 1) |
| | max-num-carriers-ul | Refer to XRAN YANG modules for details (Table 1) |
| | max-carrier-bandwidth-ul | Refer to XRAN YANG modules for details (Table 1) |
| | max-power-per-tx-antenna | Refer to XRAN YANG modules for details (Table 1) |
| | min-power-per-tx-antenna | Refer to XRAN YANG modules for details (Table 1) |
| | scaling-factor | Refer to XRAN YANG modules for details (Table 1) |
| | number-of-antenna-ports | Refer to XRAN YANG modules for details (Table 1) |
| | Carrier-mode | TDD, FDD |
| | Frame-ratio | For TTD only |

The attributes above can be defined for the RRU 105 using YANG. Following XRAN YANG modules from XRAN can be used to define above Radio Capabilities. A table of YANG models is given in Table 1.
 a. xran-module-cap.yang
 b. Device and Hardware Capabilities
  This manage object contains the device and hardware information. The Following XRAN defined YANG module can be used.
   a) xran-hardware.yang RRUs 105-n can be configured to be available as part of each RRU 105-n inventory data during pre-provisioning activity. The following attributes can be available as part of RRU 105 inventory data (reference xran-hardware.yang and ietf-hardware.yang):
i. serial-num
ii. mfg-name
iii. model-name
iv. uuid The rest of the configuration and operation attributes can be obtained from the RRU 105 using a "get" operation. These attributes are covered under following yang modules:
 a. xran-hardware.yang
 b. ietf-hardware.yang
 c. iana-hardware.yang Initial configuration file(s) can be created for the RRU 105 during pre-provisioning of the RRU 105 based on above XRAN based modules, and these configuration files can be downloaded to the RRU 105 during bootup sequence of RRU.

Provisioning Requirements

Figures 6, 7:
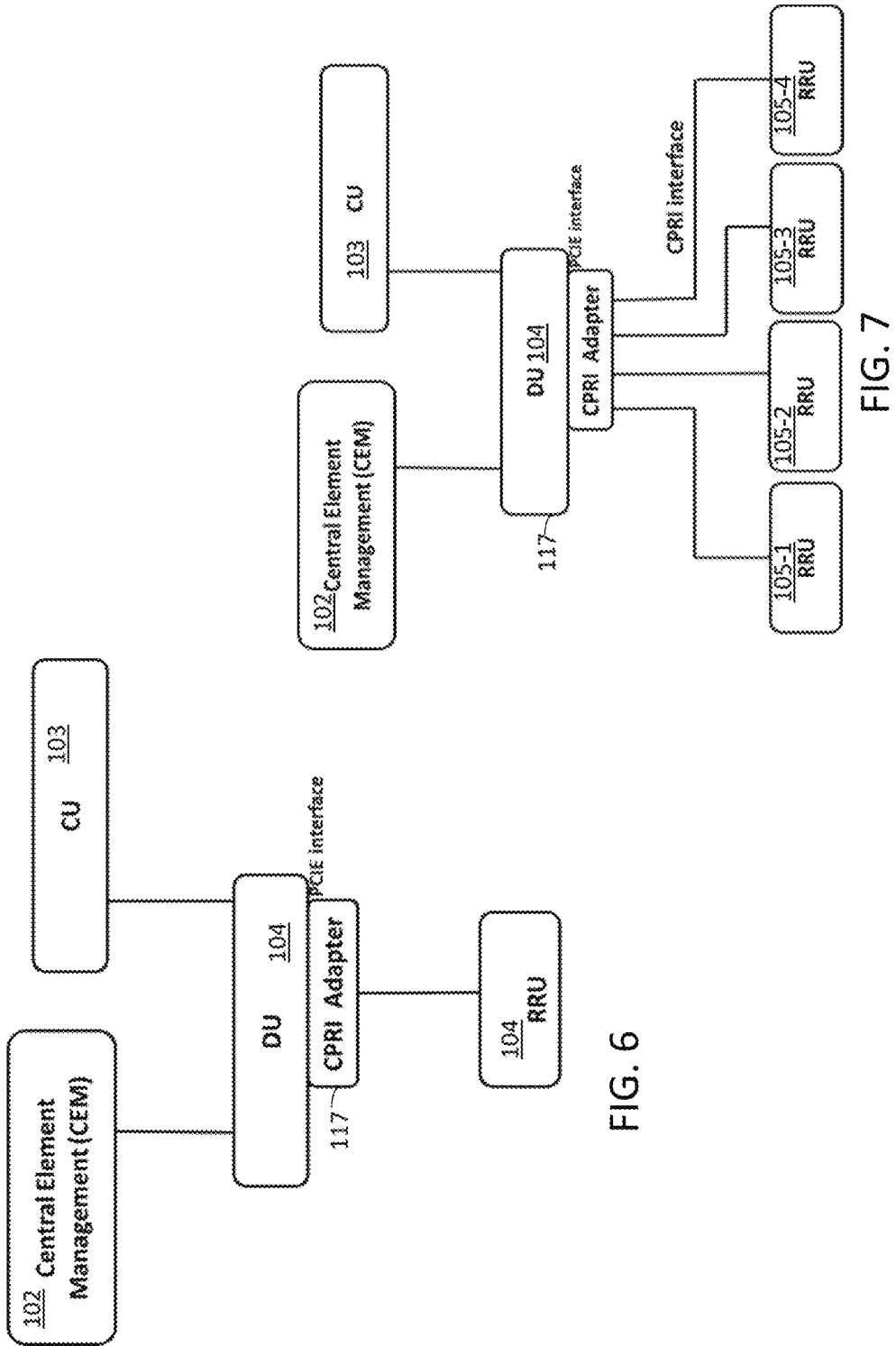
FIG. 6 is an embodiment of a point to point connection with a single CPRI link and RRU 105 connectivity.
FIG. 7 is an embodiment of a point to point connection with multiple CPRI links and multiple RRUs connected to a CPRI adapter.

Support one or more RRUs 105-n configured on the CPRI Adapter 117. In an embodiment, up to three RRUs 105-n can be supported per CPRI Adapter 117. In an embodiment, the following RRU 105 configurations can be supported:

A data model can support the RRU 105 configurations. This configuration can include the following:

A single RRU 105 per CPRI Adapter 117. FIG. 6 illustrates an embodiment of a point to point connection with a single CPRI link and RRU 105 connectivity.

Multiple RRUs 105-n per CPRI Adapter, with direct connection to the RRU 105 using CPRI interface. FIG. 7 illustrates an embodiment of a point to point connection with multiple CPRI links and multiple RRUs 105-n connected to a CPRI adapter.

Figure 8:
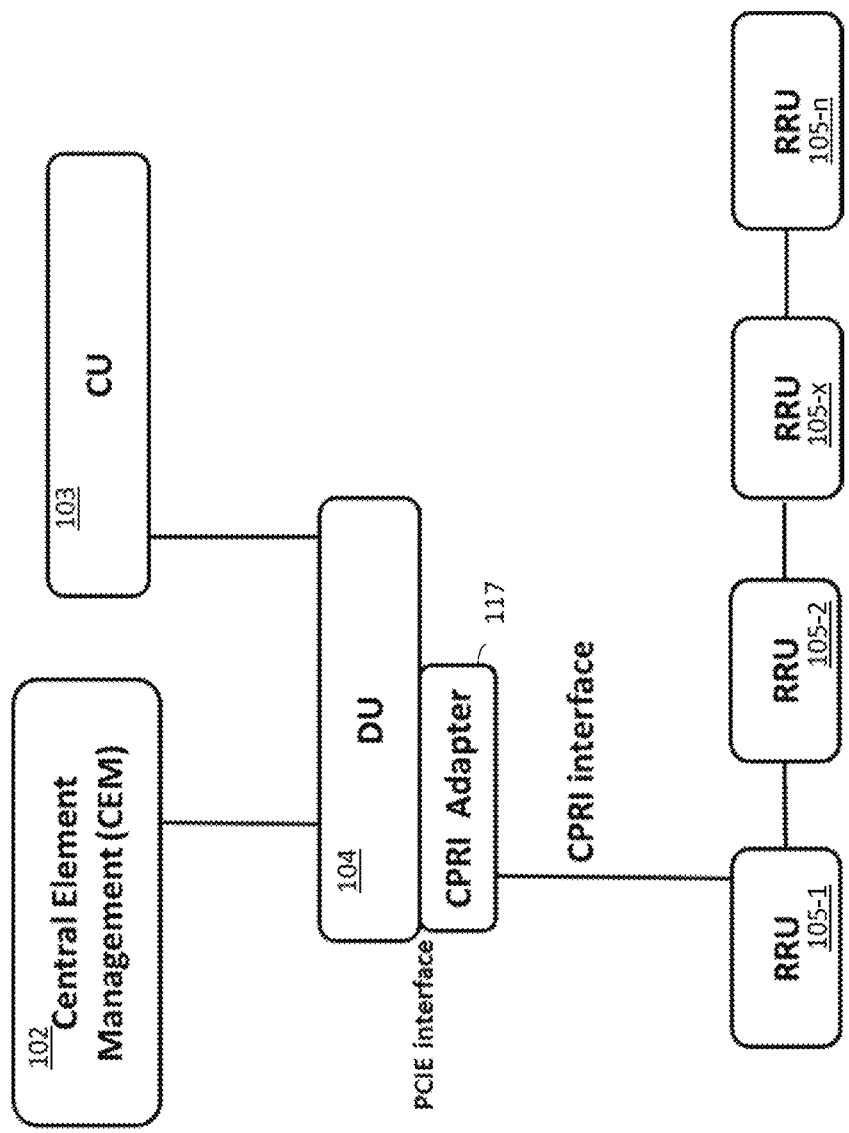
FIG. 8 is an embodiment of RRUs connected as a daisy chain with single CPRI link to CPRI adapter.

Multiple RRU 105 per CPRI Adapter, daisy chained. When the RRUs 105-n are connected in a daisy-chain, the number of RRUs 105-n in the daisy-chain link should be defined and the position of each RRU 105-n should be position in the daily-chain link. FIG. 8 shows an embodiment of the RRUs 105-n connected as a daisy chain with single CPRI link to CPRI adapter.

A data model that is defined for the RRU 105 can follow the framework being defined by XRAN Management Plane Specification, 2018.12.13-XRAN-FH.MP.2.0, the entirety of which is incorporated by reference hereby. Any vendor specific or third party extensions can be added if required. Operational data can be grouped or partitioned separately and managed and updated by applications.

When the RRUs 105-n bootup and register with CEM 102a, CEM 102a can be configured to associate the RRUs 105-n to DU/CPRI adapter 117. CEM 102a can support the CU 103, the DU 104 and the RRU 105 topology.

Operational Requirements

CEM 102a and OAM module 108 functions can be configured to support operations as described in this section.

CPRI Adapter Operation Management

CEM 102a can be configured to support operation to reboot/reset the CPRI Adapter 117.

The OAM module 108 functions in the DU 104 and CPRI Adapter 117 can be configured to support operational state/information of the CPRI Adapter 117.

RRU Operation Management

The CEM 102a can be configured to support following operations for RRU:Reset—restarts the RRU 105 with the last running persistent data. No configuration data is downloaded to RRU 105.

Lock (disable). When RRU's 105 admin-state is locked, any requests from the DU 104 to activate the carrier is configured to be rejected by RRH. Lock state is triggered via edit-config request with request to transition the admin-state to "locked" state as covered in XRAN Management Plane Specification, 2018.12.13-XRAN-FH.MP.2.0, section 6.1.2, the entirety of which is incorporated by reference hereby.

Unlock (enable). Unlock state is triggered via edit-config request with request to transition the admin-state to "unlocked" state as covered in XRAN Management Plane Specification, 2018.12.13-XRAN-FH.MP.2.0, the entirety of which is incorporated by reference hereby Factory Reset—restarts the specified RRU 105 with the factory shipped software and configuration.

The CEM 102a can be configured to perform following actions before sending lock operation to RRU.

Deactivate the cells associated with the RRU 105 by setting admin-state of cell to LOCK and notifying CU. CEM 102a can be configured to perform lock of all the cells associated with RRU.

The CU 102a can be configured to notify the DU 104 for the deactivated cells.

The DU 104 can be configured to deactivate the TX carriers and RX carriers associated with the cells associated with the RRU 105 by setting all the carriers to DISABLE.

The CEM 102a can be configured to send a lock request to the RRU 105 and update the admin-state to locked.

The CEM 102a can be configured to also notify the DU 104 about RRU's lock state.

Similarly, for an unlock operation, the CEM 102a can be configured to perform following actions:

The CEM 102a can be configured to send unlock request to the RRU 105 and update the admin-state to unlocked.

The CEM 102a can be configured to notify the DU 104 about UNLOCK state of RRU.

A send activate cell (by setting admin-state=UNLOCK) to message to CU 103 from CEM 102a can include a list of cells associated with RRU.

The CU 103 can be configured to notify the DU 104 for the activated cells. The DU 104 can be configured to activate the TX and RX carriers associated with the cell or cells served by RRU.

The CEM 102a can be configured to deactivate/activate the cells associated with the RRU 105 at CU 103 as part of locking and unlocking of the RRU 105.

If the RRU 105 is unlocked, the following operational or availability statuses can be provided to CEM:
Available and running
Failed—when the RRU 105 is not functional and inoperable
Degraded—degraded due to partial failure and the RRU 105 is not fully functional.

Reference is made to xran-hardware.yang and ietf-hardware.yang for operational state and notifications to be supported as shown in Table 1.

The OAM module 108 functions in the RRU 105 can support operational state/information of the RRU. The RRU 105 can be configured to send Netconf notifications to CEM for operational state changes. Reference is made to xran-harware.yang and ietf-hardware.yang as shown in Table 1 for notification details.

Every time the RRU 105 restarts, a NETCONF session is closed. The DU OAM 108 module 108 can be configured to reestablish the NETCONF session to RRU 105.

The CEM 102a can be configured to send enable-RRU rpc to the DU 104 whenever the RRU 105 successfully completes restart/initialization (when CEM receives pnf-restart-status notification with status=COMPLETED). The DU Application in coordination with DU OAM module 108 can be configured to activate the TX and RX carriers for the affected the RRU 105 provided the DU 104 admin-state is UNLOCKED and the admin-state of the cells associated with the RRU 105 are UNLOCKED.

DU Application (Layer 2) Requirements

If the CPRI link alarms are persistent, this is detected by a SUPERVISION failure. The RRU 105 supervision failure is reported to the L2 application and CU 103 over the V1 interface. The RRU 105 id is included in the notification message.

A DU application can react to certain alarms reported by RRU 105. The DU 104 subscribes to the alarm stream (xran-du-subs-ru-alarm) from RRU 105. Following the RRU 105 alarms are included in the xran-du-subs-ru-alarm alarm stream:

TABLE 4

RRU Alarms

| Alarm Id | Alarm Name |
| --- | --- |
| 1 | Unit Temperature Is High |
| 2 | Unit Dangerously Overheating |
| 3 | Ambient Temperature Violation |
| 4 | Temperature Too Low |
| 9 | Transmission Quality Deteriorated |

The RRU 105 alarms are be forwarded to CU 103 over a V1 interface and include the RRU 105 id in the V1 interface message.

The DU 104 application is configured to react when lock (disable) and unlock operation is performed on RRU 105.

The DU 104 application is configured to react when the RRU 105 reset or factory reset operation is performed on RRU.

The DU 104 application is configured to react when lock (disable) and unlock operation is performed on CPRI adapter.

The DU 104 application is configured to react when reset operation is performed on CPRI adapter.

The DU 104 is configured to periodically monitor the temperature of CPRI adapter.

The DU 104 is configured to periodically monitor the temperature of each RRU.

The DU 104 is configured to report high temperature alarm for the RRU 105 when the temperature outside the normal range is detected. The normal range would be defined for the supported RRUs 105-n. When high temperature alarm is raised by RRU, the DU 104 is configured to report these alarms to CU. CU is configured to reduce the traffic or lower the operating power to lower value.

At startup of the RRU, the DU 104 is configured to obtain the radio module capabilities of the RRU 105 using NETCONF interface—this information would include maximum and minimum supported downlink frequency, uplink frequency, max number of downlink and uplink carriers, maximum supported uplink and downlink bandwidth, minimum and maximum power per TX antenna etc. Reference is made to XRAN Management Specification, 2018.12.13-XRAN-FH.MP.2.0.0, the entirety of which is incorporated by reference hereby, which covers how the RRU 105 module capabilities are retrieved during startup of RRU 105.

If the RRU 105 does not support NETCONF interface, the DU 104 can be provided with the static configuration of the RRU 105 during startup of the RRU 105 by CEM as discussed under the RRU CONFIGURATION section above.

If the RRU 105 fails to respond to heartbeat for a configured threshold, the DU 104 is configured to initiate a reset of the affected RRU. The DU 104 is configured to report supervision failure notification to CU over V1 interface.

DU 104 is configured to support the supervision of CPRI Adapter 117 to ensure it is functional. The DU 104 is configured to perform periodic heartbeat of CPRI Adapter 117 after it is brought into service. The heartbeat timer to the CPRI Adapter 117 can be configured with a default of 3 seconds.

The DU 104 application is configured to interface with DU OAM module 108 to enable the TX and RX carriers whenever the RRU 105 restarts successfully and the cells associated with the RRU 105 are in admin-state=unlocked. The DU 104 is be notified by CEM whenever the RRU 105 successfully restarts.

IP and DHCP Requirements

NMS 102 (CEM/SDM), RRU 105, the DU 104, CU 103 and CPRI Adapter 117 can be configured support IPv4 and IPv6.

RRUs 105-*n* are configured to obtain their IP address from DHCP server 120.

RRUs 105-*n* can be assigned IP addresses manually and can have dependency on the support from RRUs 105-*n*.

RRU 105 IP address allocation is a deployment option where a local IP address can be assigned per DU 104, or globally reachable IP address can be assigned to RRU 105. If globally reachable IP address are assigned to RRU 105, no IP forwarding/routing function is required in the DU 104.

DHCP server 120 is configured to provide the RRU 105 with the FQDN or IP address of the DU 104 and NMS 102 (CEM/SDM) using an option 43 for DHCPv4 and option 17 for XRAN Management Plane Specification, 2018.12.13-XRAN-FH.MP.2.0. The DHCP Server knows the mac address of the DU 104 from the IP header and provides the associated the RRU 105 IP address or FQDN.

DU is configured to provide DHCP relay function for RRUs 105-*n* to access DHCP server.

Sync Requirements

Requirements have dependency on DU/CPRI adapter and Third Party RRU 105 and are subject to change. In an initial phase 1, it is assumed that GPS available from CPRI Adapter 117 is configured to be used for timing synchronization by the DU 104 and the RRUs 105-*n*.

CPRI Adapter 117 is configured to support Time of Day using the NTP-ToD from a central NTP server. In another embodiment, GPS can be used by the CPRI adapter to support time of day.

The RRU 105 is configured to get timing synchronization over the CPRI interface. GPS is available on CPRI Adapter 117.

Delay Measurement Requirements

There are propagation delays between the DU 104 and the RRU 105 in the uplink and downlink directions over the fronthaul based on the functional split. The delay parameters are used to adjust the receive buffering and windows for the CU-plane data DU 104 and the RRU 105 are configured to support the delay measure procedures and parameters specified in the XRAN Management Plane specifications 2018.12.13-XRAN-FH.MP.2.0.0. This requirement is supported based on the support from a Third Party RRU 105.

In initial phase fix delay (delay adjustment) is configured at the CPRI Adapter 117 as described herein.

Alarm Requirements

A DU/CPRI Adapter 117 is configured to only report CPRI link alarms for unlocked CPRI links. DU/CPRI Adapter 117 is configured to clear the previously raised CPRI link alarm when the CPRI link is up and functional. When reporting CPRI link alarm, impacted CPRI link is configured to be identified.

The CPRI Adapter 117 is configured to detect, handle and report following alarms to DU OAM module 108 as per CPRI Specifications as known in the art, including:

Loss Of Signal (LOS)
Loss of Frame (LOF)
SAP defect Indication (SDI)
Remote Alarm Indication (RAI).

As will be appreciated, these CPRI related alarms can result in supervision failure of RRU 105.

If a CPRI card fails, CPRI-CARD-FAILURE alarm is configured to be generated and all the RRUs 105-*n* associated with the CPRI Adapter 117 are impacted. The DU OAM module 108 is configured to report the failure to L2 application and CU 103 is notified for the impacted RRUs 105-*n*.

The DU 104 is configured to only report supervision failure of the RRU 105 and identity of the impacted the RRU 105 is configured to be included in the alarm. The DU 104 is configured to report the affected RRU 105 to CU 103 (or cells associated with the RRU).

The DU 104 is configured to report high temperature alarm for CPRI Adapter 117 when the temperature outside the normal range is detected.

CEM is configured to support the alarms as specified in XRAN Management Specification, 2018.12.13-XRAN-FH.MP.2.0.0.

The NETCONF Server is responsible to send an Alarm <alarm-notif> to a NETCONF Client when the NETCONF Client has "subscribed" to alarm notification. Alarms are described the XRAN Management Plane Specification, 2018.12.13-XRAN-FH.MP.2.0, the entirety of which is incorporated by reference hereby at.

When any alarm is reported on the DU 104, CPRI Adapter 117 or RRU 105, CEM 102*a* is configured to also indicate the alarm on the CU/DU/RRU topology using suitable color code indicating severity of alarm. The RRU 105 is configured to push alarm data per the XRAN standard yang.xran-fm.yang, for example

```
<notification xmlns="urn:ietf:params:xml:ns:netconf:notification:1.0">
    <eventTime>2017-02-28T09:01:12Z</eventTime>
    <alarm-notif xmlns="urn:xran:fm:1.0">
        <fault-id>17</fault-id>
        <fault-source>Module</fault-source>
        <affected-objects>
            <name>MTIRRH</name>
        </affected-objects>
        <fault-severity>MAJOR</fault-severity>
        <is-cleared>false</is-cleared>
        <fault-text>AlarmClockFault</fault-text>
        <event-time>2017-02-28T09:01:12Z</event-time>
    </alarm-notif>
</notification>
```

RRU Led Status

CEM 12*a* and OAM module 108 functions are configured to support a generic framework for reporting the LED status of each RRU 105 connected to CPRI Adaptor 117 based on the LED profile associated with the RRU 105 type. A separate LED profile is configured to be defined for each supported RRU 105 type from different vendors.

Software Management Requirements

RRU Software Management

Support for some of the following requirements would depend on the features and capabilities supported by various Third Party RRU.

CEM 102*a* is configured to support software upgrade of the RRU 105. The RRU 105 is configured to download the software from the ftp server directory provided by CEM 102a. A FTP server can be accessible to both CPRI Adapter 117 and Third Party RRUs 105-n. After software is downloaded, notification is sent to CEM 102a indicating success or failure to download the files.

CEM 102a is configured to send activate request to the individual RRU 105 for the new software to be accepted by validating the downloaded software and performing checksums.

CEM 102a is configured to have ability to query and displaying the details of software version running on RRU.

RRU 105 is configured to persist the software load shipped from the factory and support factory reboot operation from CEM 102a/DU 104 to bring the RRU 105 in service using factory shipped software.

CPRI Adapter Software Management

Software update of CPRI adapter can be done as part of a DU 104 software upgrade.

CEM 102a and the DU 104 are configured to support software upgrade of CPRI Adapter 117. The OAM module 108 on DU/CPRI Adapter 117 is configured to download the software from a FTP server directory provided by CEM 102a. After software is downloaded, CPRI Adapter 117 is configured to send a notification to the DU 104 and CEM 102a indicating success or failure to download the files.

CEM 102a is configured to send an activate request to CPRI Adapter 117 for the new software to be accepted.

CPRI Adapter 117 is configured to store the details of software version running on CPRI Adapter 117. CEM 102a is configured to have ability to query CPRI Adapter 117 to display the software version running on CPRI Adapter 117 as well as previous version of software.

CPRI Adapter 117 is configured to store copy of the current and previous version of CPRI Adapter 117 software.

The following section explains how administration, operations and management functions are performed in various embodiments.

RRU Cold Startup, Discovery, Interface to DU/CU and CEM

Figure 9A:
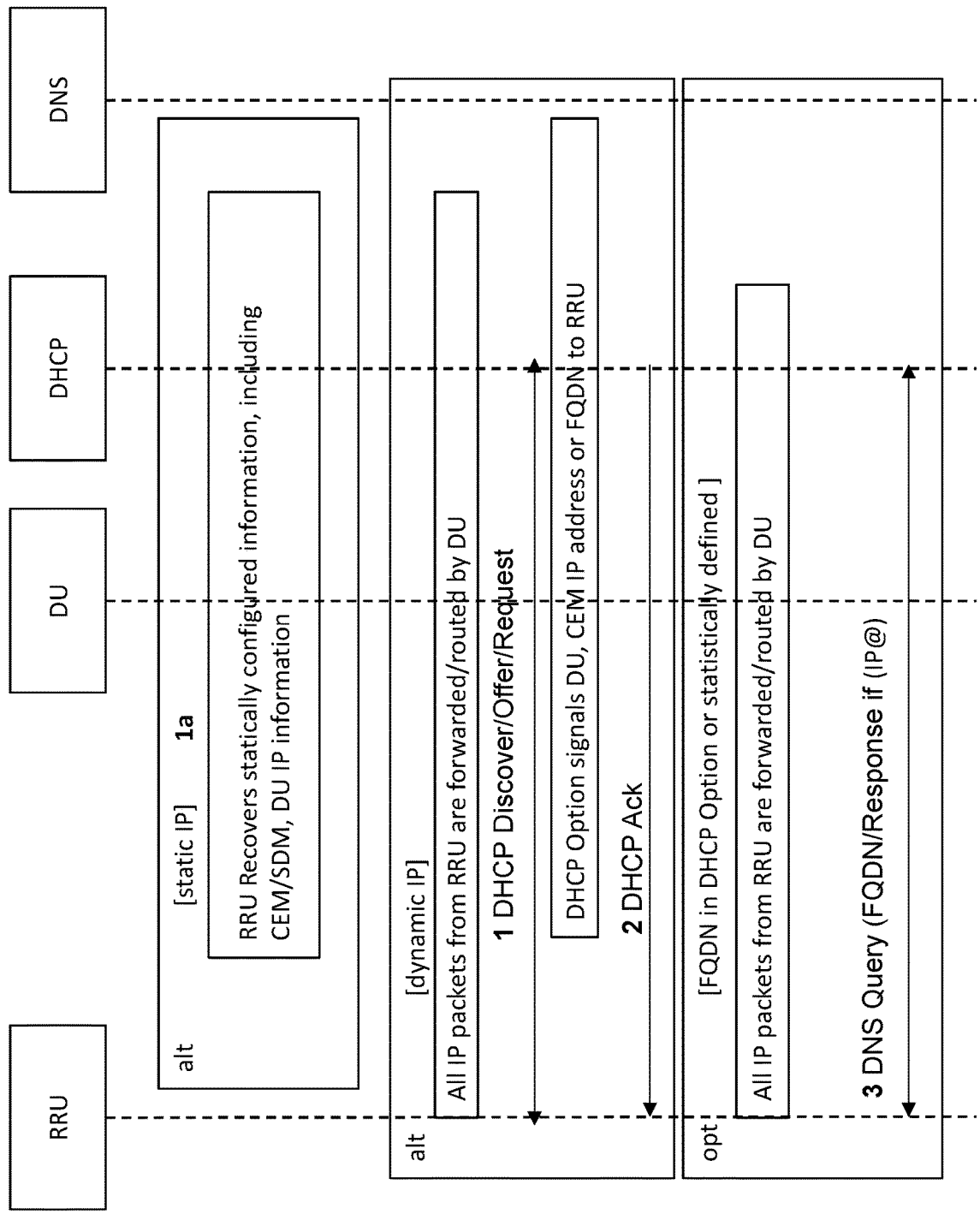
FIGS. 9A-9C are flow charts illustrating a message sequence for RRU 105 startup, discovery, and interface to a DU/CU and an NMS.
Figure 9B:
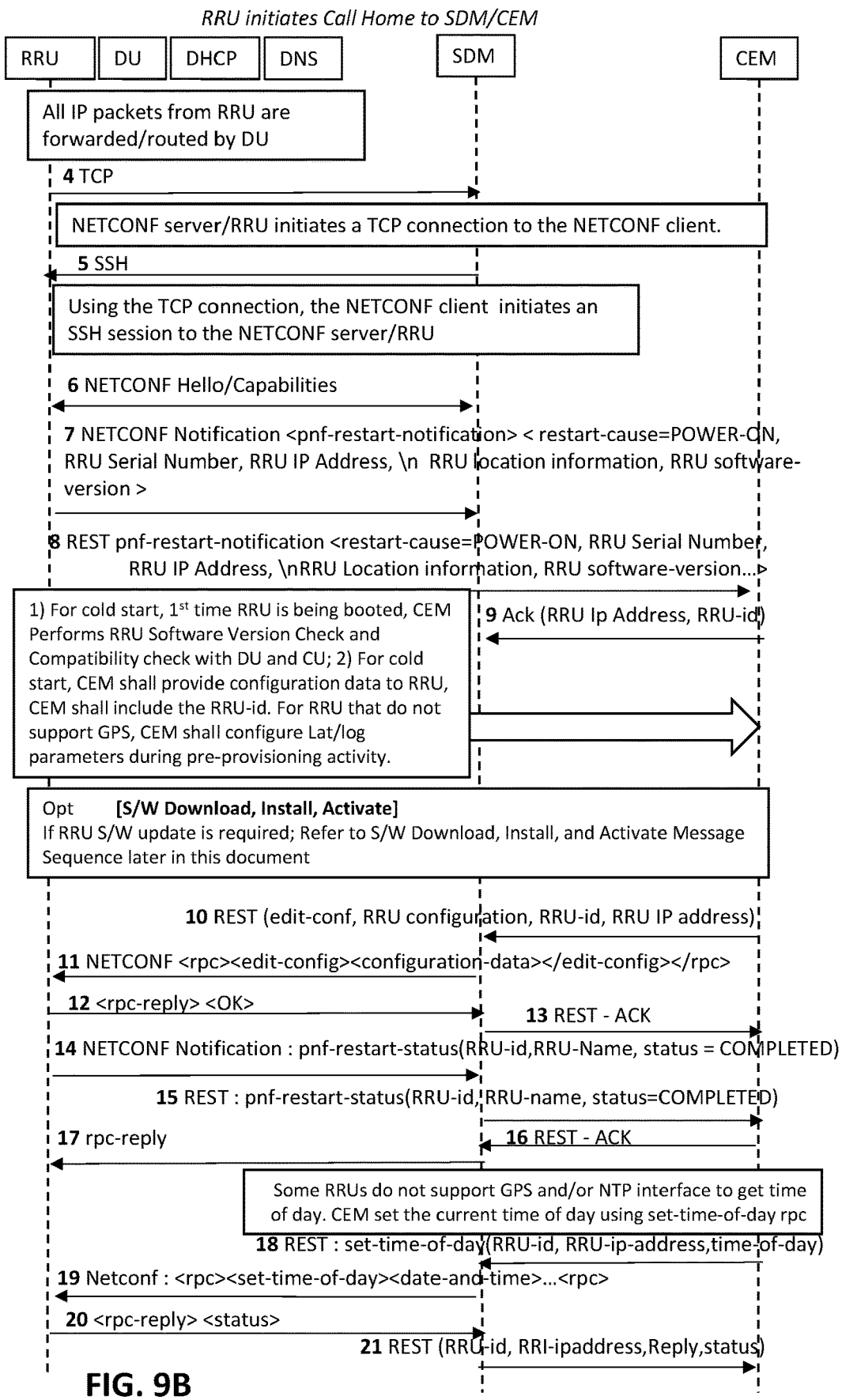
Figure 9C:
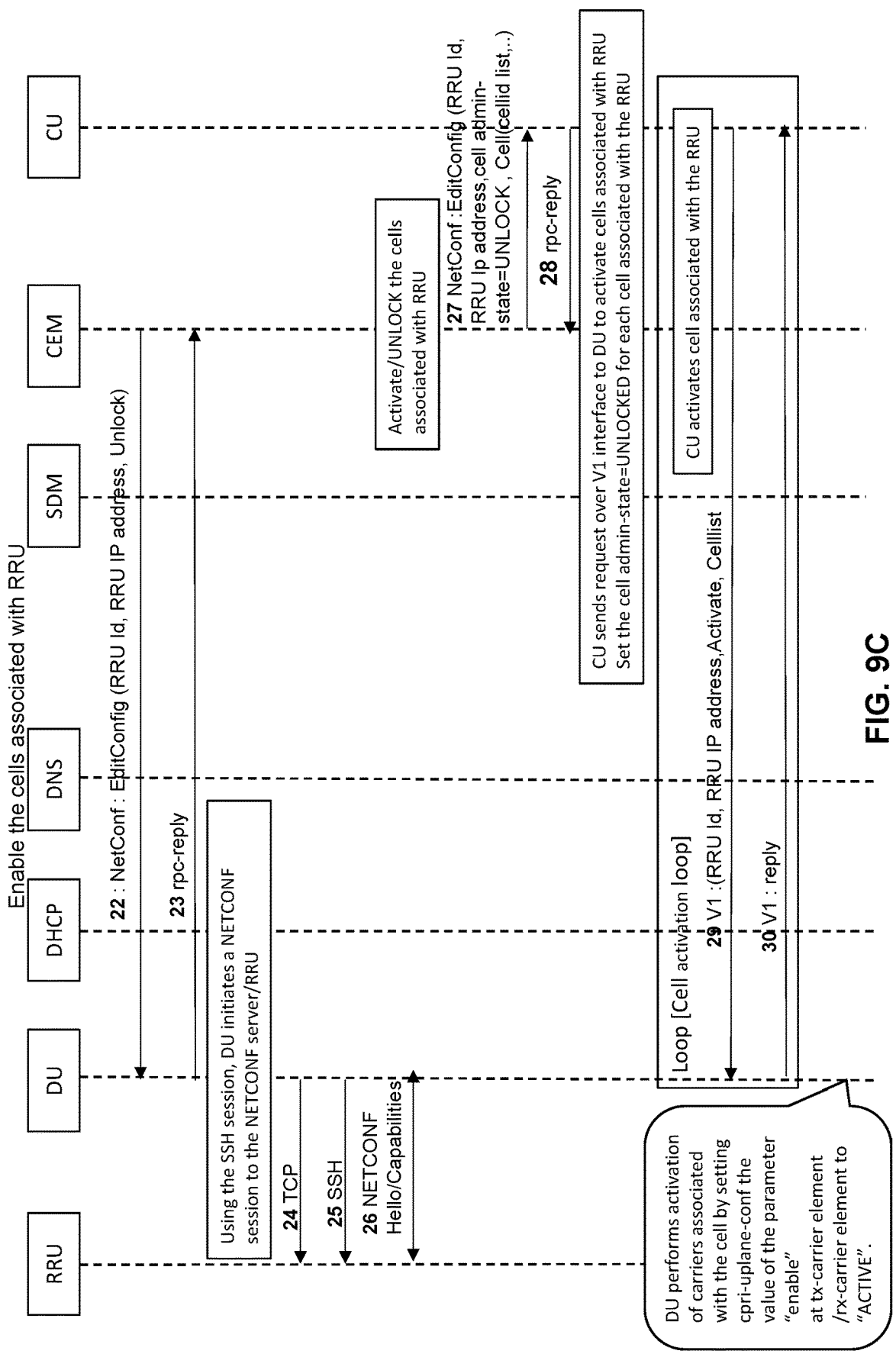

FIGS. 9A-9C are flowcharts illustrating a message sequence for RRU 105 startup, discovery, and interface to the DU 104, CU 103 and the NMS 102 (CEM 102a/SDM 102b).

RRU Bootup Sequence

In an embodiment, the following steps can be performed during the RRU 105 power on and startup sequence:

During the DU 104 startup, CPRI Adapter 117 card can be configured and the CPRI links to the RRUs 105-n can be initiated. This includes physical ports, ethernet interfaces associated with the physical port. Any pre-assigned VLANs associated with the ethernet interfaces can also be initiated. IPV4 or IPV6 addresses are assigned in subsequent steps, as shown below.

Next, as shown in FIG. 9A, the RRU 105 establishes transport layer establishment to the SDM 102b of the NMS 102. For a first option, as shown at block 1a, the RRU 105 can be configured for a static and manual configuration of IP addresses of the RRUs 105-n and the DU 104. The RRU 105 can also be configured for dynamic configuration an IP address. As shown at block 1, the DHCP Server provides the transport address of the RRU 105 and the DU 104, which at block 2 is acknowledged by the DHCP. At block 3, the RRU 105 queries the DNS if FQDN of the SDM/CEM is provided.

As shown in FIG. 9B, the RRU 105 initiates call home feature as per RFC 8071, the entirety of which is incorporated by reference hereby. At block 4, the RRU 105 establishes a TCP connect connection to NETCONF client on the SDM of the NMS via the DU, where all packets from the RRU to the NMS (SDM/CEM) are forwarded by the DU. At block 5, the NETCONF Client on SDM initiates SSH session to RRU. At block 6, NETCONF capabilities are initiated by NETCONF Client on SDM and the NETCONF Server on RRU. At block 7, the following information is provided to SDM/CEM during a first contact notification (pnf-restart-notification):

TABLE 5 pn-restart-notification

| Attribute | Where to Pick from |
|---|---|
| serial-num | Pre-configured Initial Configuration from Factory |
| mfg-name | Pre-configured Initial Configuration from Factory |
| uuid | Pre-configured Initial Configuration from Factory, if available |
| hardware-rev | Pre-configured Initial Configuration from Factory |
| software-rev | Send "NULL" if no SW available |
| ru_ip | Obtained from DHCP server, RU IP Address |
| restart-cause Enum (POWER-ON, SOFTWARE FAILURE, SUPERVISION-WATCHDOG etc) | (POWER-ON) To Let SDM know this is very first contact from DU |
| RRU-Latitude | if available, if RRH has GPS. If RRU does not support GPS, latitude are pre-provisioned for RRU and provided to RRU. |
| RRU-Longitude | if available, if RRH has GPS. If RRU does not support GPS, longitude are be pre-provisioned for RRU and provided to RRU. |

At block 8, the NMS 102 SDM notifies CEM via REST interface indicating RRU 105 cold-start (POWER-ON) when powered up for the first time, providing RRU 105 Id/serial number, mfg-name, uuid and RRU 105 IP address, which the NMS CEM acknowledges at block 9. If RRU 105 does not support location, then location information (latitude/longitude) can be provided as part of pre-provisioned data to RRU 105. At block 10 the CEM triggers a download, install and activate sequence as described in blocks 10-21 of the call flow sequence.

After RRU 105 goes through reset sequence, RRU 105 can indicate following in the messages to CEM:

1) pnf-restart-notification—during any restart including first time power on or any other restart cause. An RRU 105 restart message sequence is described herein.
2) pnf-restart-status—as shown at blocks 14-17, when RRU 105 restart is completed with the software and configuration data provided by CEM, the RRU 105 is configured to include status of the RRU 105 startup/initialization. If initialization fails, the RRU 105 is configured to return status=FAILED and provide additional information in the error-message (not shown).

Some RRUs 105-n do not support GPS and/or NTP protocol. Accordingly, in an embodiment, as shown at block 18, the CEM 102a is configured to set the time-of-day by invoking set-time-of-day rpc, and at block 19 the time-of-day is relayed to the RRU. At block 20 the RRU 105 confirms reply (RRU ID, RRU IP address, and reply status to the CEM.

At blocks 22-28, CEM activates the RRU 105 by sending messages to the CU and the DU 104, as shown in FIG. 9C.

The CEM 102a determines which CU 103 is associated with the DU 104, notifies the CU, the DU 104 and RRU, enables the RRU 105 and associates the RRU 105 Cells It is assumed that the RRU 105 admin-state is enabled at startup. If RRU 105 does not fully support XRAN M-Plane interface (e.g. at an initial phase) the CEM can also provide the DU 104 with the RRU 105 module and radio capability information using pre-provisioned Cell Configuration data to CU when the DU 104.

At block 22, the CEM 102a sends to the DU 104 the following message: NetConf:EditConfig (RRU Id, RRU IP address, Unlock).

At block 23, the DU 104 sends to the CEM 102a an rpc-reply message. Using the SSH session, the DU 104 initiates a NETCONF session to the NETCONF server/RRU. t block 24 the DU 104 sends a TCP message to the RRU 105. At block 25 the DU 104 sends an SSH message to the RRU 105. At block 23 the DU 104 and the RRU 105 confirm NETCONF activation: <NETCONF Hello/Capabilities>.

The CEM 102a is then configured to activate and unlock the cells associated with RRU 105. At block 27, the CEM sends to the CU an RRU 105 unlock cell message: <NetConf:EditConfig (RRU Id, RRU Ip address, cell admin-state=UNLOCK, Cell (cellid list, . . . )>. At block 28 the CU sends to the CEM: rpc-reply.

Next, the CU sends a request over a V1 interface to the DU 104 to activate cells associated with RRU. The cell admin-state is unlocked for each cell associated with the RRU 105. A loop cell activation loop activates cells associated with RRU. At block 29, the CU 103 sends an activation message to the DU 104 over a V1 interface: (RRU Id, RRU IP address, Activate, Celllist). At block 30, the DU 104 sends to the CU reply via the V1 interface.

The DU 104 performs activation of carriers associated with the cell by setting a <cpri-uplane-conf" value of the parameter "enable" at tx-carrier element/rx-carrier element to "ACTIVE".

RRU Software Upgrade

Software Management follows the XRAN Management Plane Specification, 2018.12.13-XRAN-FH.MP.2.0, the entirety of which is incorporated by reference herein.

Figure 10:
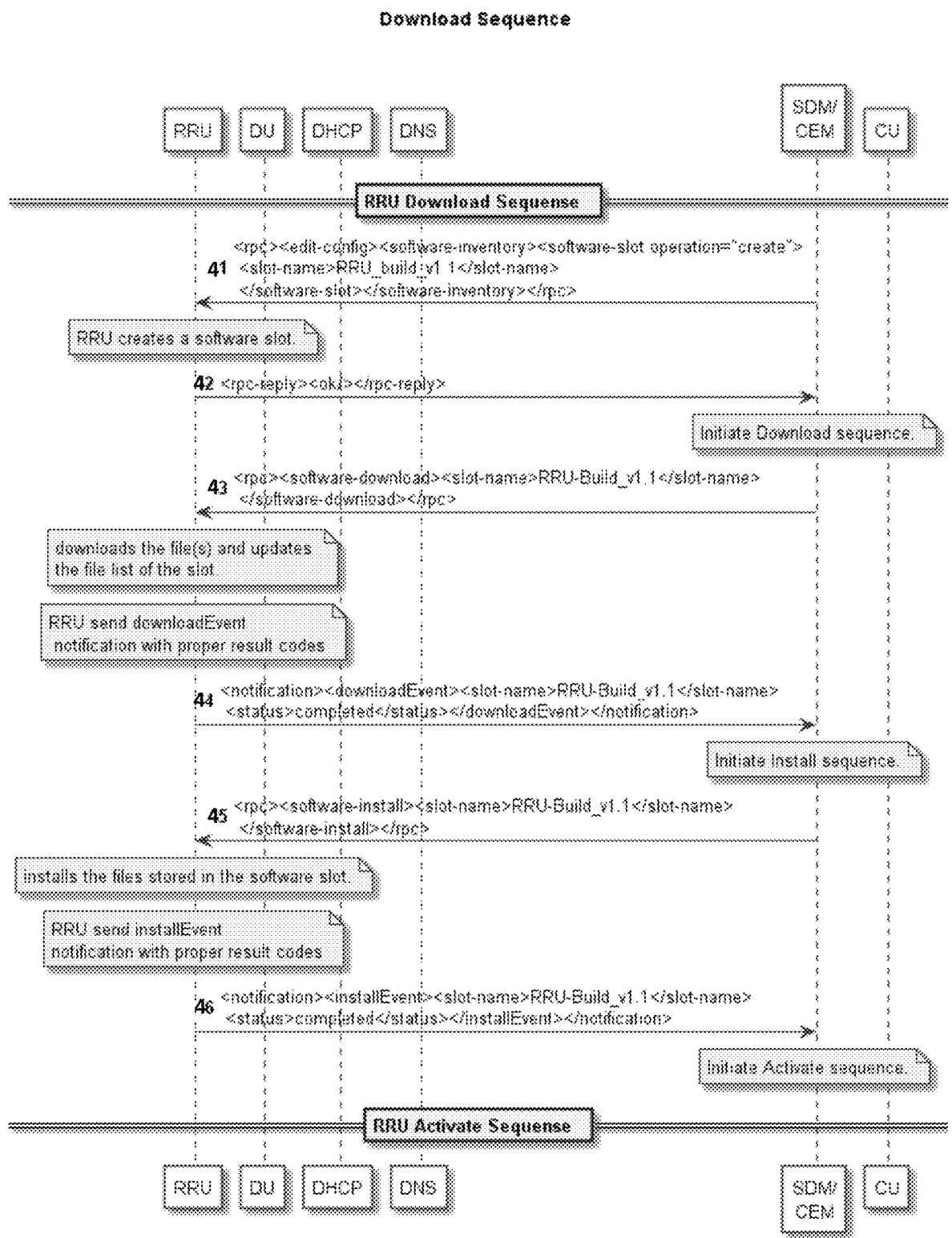
FIGS. 10-11 are flowcharts illustrating messaging for a software upgrade of RRU.
Figure 11:
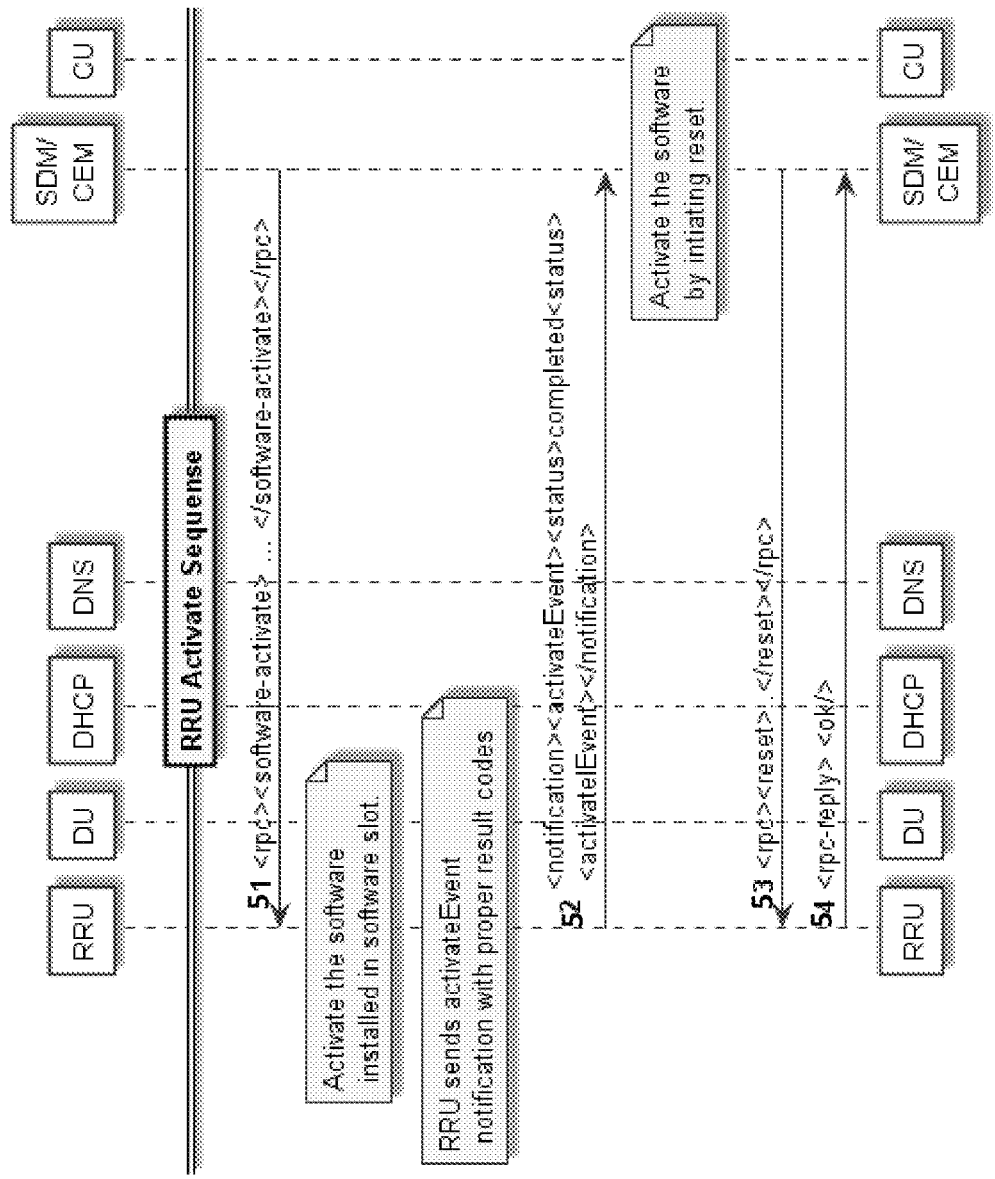

In an embodiment, FIGS. 10-11 are flowcharts illustrating messaging for a software upgrade of RRU. FIG. 10 illustrates a flowchart and messaging for a download sequence. FIG. 11 illustrates a flowchart for an RRU 105 activation sequence. As shown in FIG. 10, at block 41, a software upgrade is initiated at the CEM/SDM of the NMS 102. At block 42, the CEM/SDM gets the software inventory from RRU. The RRU 105 is configured to create a software-slot using edit-config function if a software-slot is not available. At block 43, CEM/SDM sends download request to the RRU 105 specifying the remote location of the software files to be downloaded. At block 44, the RRU 105 responds to the download request. The RRU 105 downloads the files from remote file server and sends the notification to CEM/SDM once it has completed downloading the files. At block 45, the CEM/SDM requests that the RRU 105 to install the software in the specified software-slot and sends a Netconf notification when installation is completed. Then the CEM/SDM activates the newly installed software-slot. At block 46, the RRU 105 sends a Netconf notification when activation is completed. The CEM/SDM performs a reset of the RRU 105 (using reset rpc) for the newly activated software to take effect.

FIG. 11 shows an RRU 105 Activate sequence for the RRU. At block 51, the CEM sends to the RRU 105 a software activate message. At block 52, RRU Restarts.

Figure 12A:
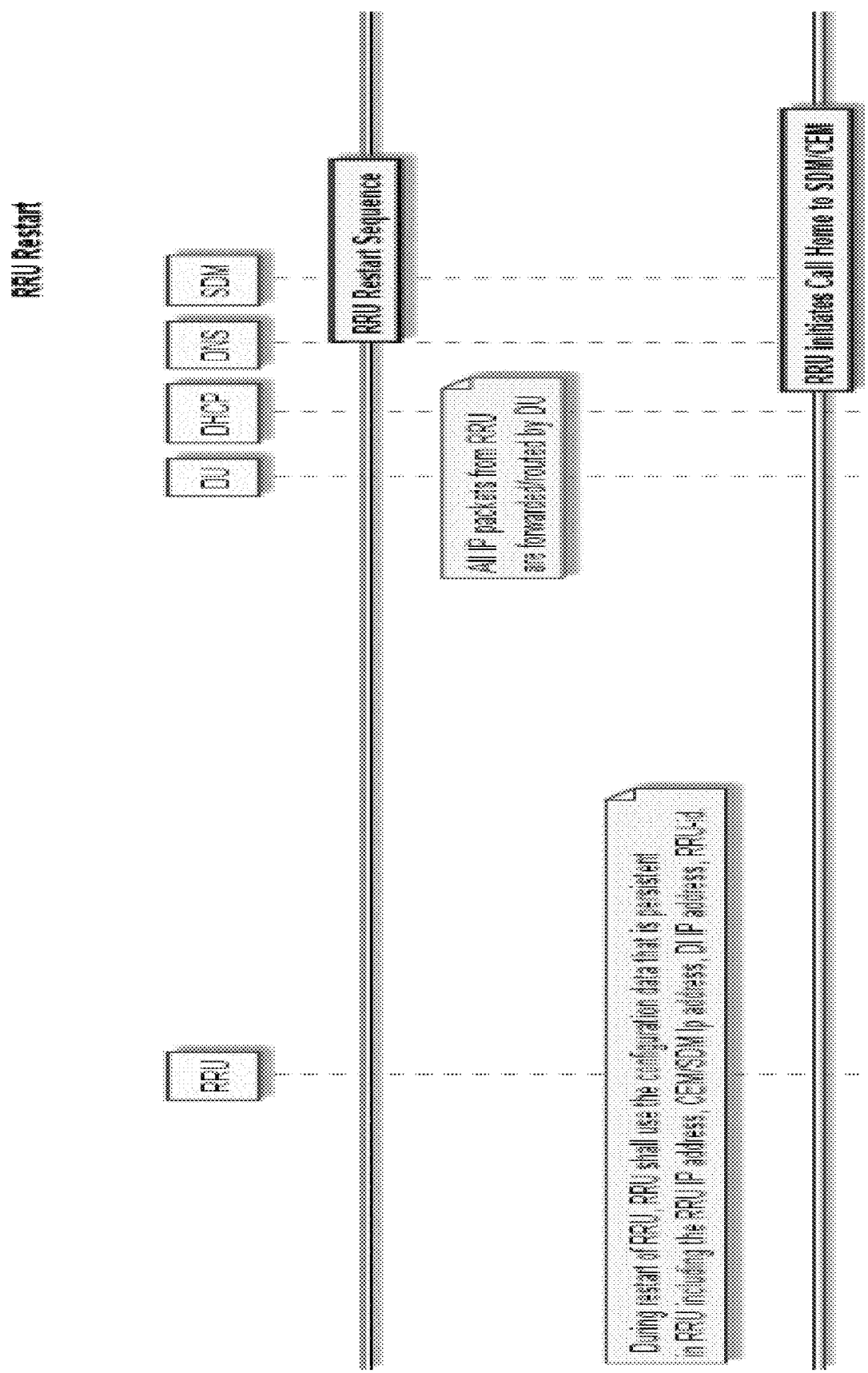
FIGS. 12A-12C is a flowchart illustrating a flowchart and message sequence for an RRU 105 restart.
Figure 12B:
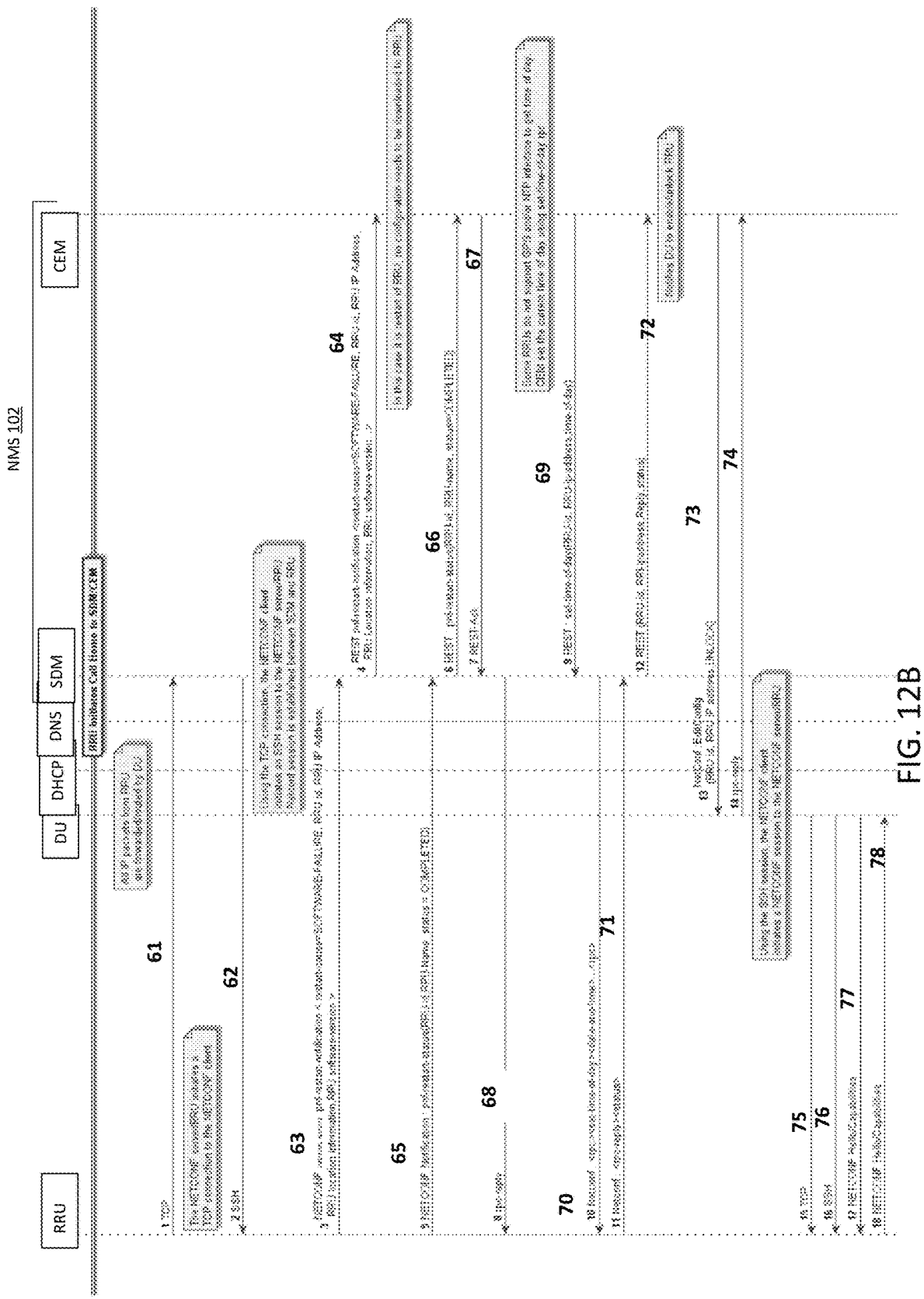
Figure 12C:
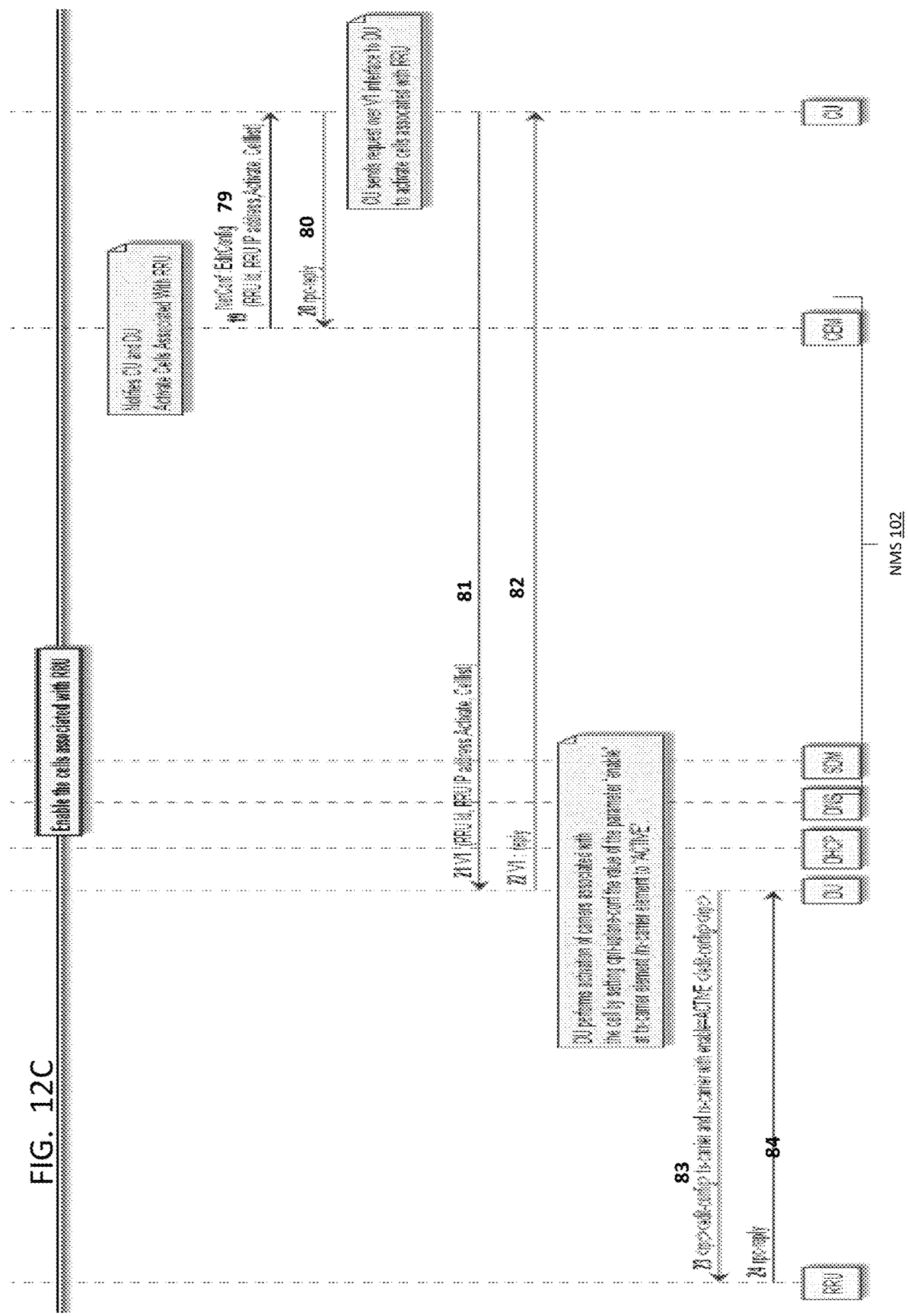

In an embodiment, FIGS. 12A-12C illustrate a flowchart and message sequence for an RRU 105 restart. As will be noted, the message sequence is a subset of the sequence already covered in earlier sections. The RRU 105 can restart for multiple reasons, for example, someone powers the RRU 105 down/up, a software failure on the RRU 105 causes an RRU restart, and the like).

At the DU 104, all IP packets from the RRU 105 are forwarded/routed by the DU 104. During restart of the RRU 105, the RRU 105 can use the configuration data that is persistent in the RRU 105 including the RRU 105 IP address, CEM/SDM Ip address, DI IP address, RRU-id.

As shown in FIG. 12A, the RRU 105 initiates a Call Home to the SDM/CEM.

Starting at FIG. 12B, all IP packets from the RRU 105 are forwarded or routed by the DU 104. In an embodiment, at block 61, the NETCONF server at the RRU 105 initiates a TCP connection to the NETCONF client. At block 62, using the TCP connection, the NETCONF client initiates an SSH session to the NETCONF server/RRU, and a NETCONF session is established between SDM and RRU. At block 63, the RRU 105 sends to the SDM a NETCONF restart notification for a software failure (>pnf-restart-notification <estart-cause=SOFTWARE-FAILURE, RRU id, RRU IP Address, \n RRU location information, RRU software-version>). At block 64, the SDM sends to the CEM a REST pnf restart notification (<restart-cause=SOFTWARE-FAILURE, RRU-id, RRU IP Address, \n RRU Location information, RRU software-version . . . >). In this case, as it is a restart of the RRU, no configuration needs to be downloaded to the RRU 105. At block 65, the RRU 105 sends a NETCONF Notification to the SDM (pnf-restart-status (RRU-id, RRU-Name, status=COMPLETED). At block 46 the SDM relays the message to the CEM, and at block 67, the CEM sends an acknowledgment to the SDM (REST-Ack). At block 68 the SDM sends a rpc reply message to the RRU.

As noted above, as some RRUs 105-n do not support GPS and/or NTP interface to get time of day, the CEM can set the current time of day using set-time-of-day rpc. At block 69, the CEM can send to the SDM a REST: set-time-of-day message ((RRU-id, RRU-ip-address, time-of-day). At block 70, the SDM sends the time of day message to the RRU 105 (Netconf: <rpc><set-time-of-day><date-and-time> . . . <rpc>). At block 71, the RRU 105 sends to the SDM a Netconf reply status message (Netconf: <rpc-reply><status>), and at block 72, the SDM sends the reply status and the RRU 105 information to the CEM (REST (RRU-id, RRI-ipaddress, Reply, status)). At block 73, the CEM notifies the DU 104 to enable/unlock RRU (NetConf: EditConfig \n (RRU Id, RRU IP address, UNLOCK)). At block 74 the DU 104 sends an rpc-reply to the CEM. Using the SSH session, the NETCONF client of the DU 104 initiates a NETCONF session to the NETCONF server at the RRU. At block 75, the DU 104 sends at TCP message to the RRU, and at block 76 the DU 104 sends the SSH message to the RRU. At block 77, the DU 104 sends a message confirming NETCONF capabilities to the RRU 105 (NETCONF Hello/Capabilities) and at block 78 the RRU 105 confirms the handshake with the DU 104 (NETCONF Hello/Capabilities).

As shown in FIG. 12C, the system is configured to enable the cells associated with RRU. At blocks 79-82, the CEM notifies CU and the DU 104 to activate cells associated with the RRU. At block 79 the CEM sends an active cell list message to the CU (NetConf:EditConfig \n (RRU Id, RRU IP address, Activate, Celllist)), and at block 80 the CU sends a reply message to the CEM (rpc-reply). At block 81, the CU sends the request over a V1 interface to the DU 104 to activate cells associated with the RRU 105 (V1:(RRU Id, RRU IP address, Activate, Celllist) and at block 82 the DU 104 sends to the reply to the CU over the V1 interface. At block 83, the DU sends an activation message to the RRU 105 to perform activation of carriers associated with the cell by setting cpri-uplane-conf the value of the parameter "enable" at tx-carrier element/rx-carrier element to "ACTIVE" (<rpc><edit-config> tx-carrier and rx-carrier with enable=ACTIVE </edit-config></rpc>). At block 84, the RRU 105 sends a reply to the DU 104 (rpc-reply).

Lock RRU

Figure 13:
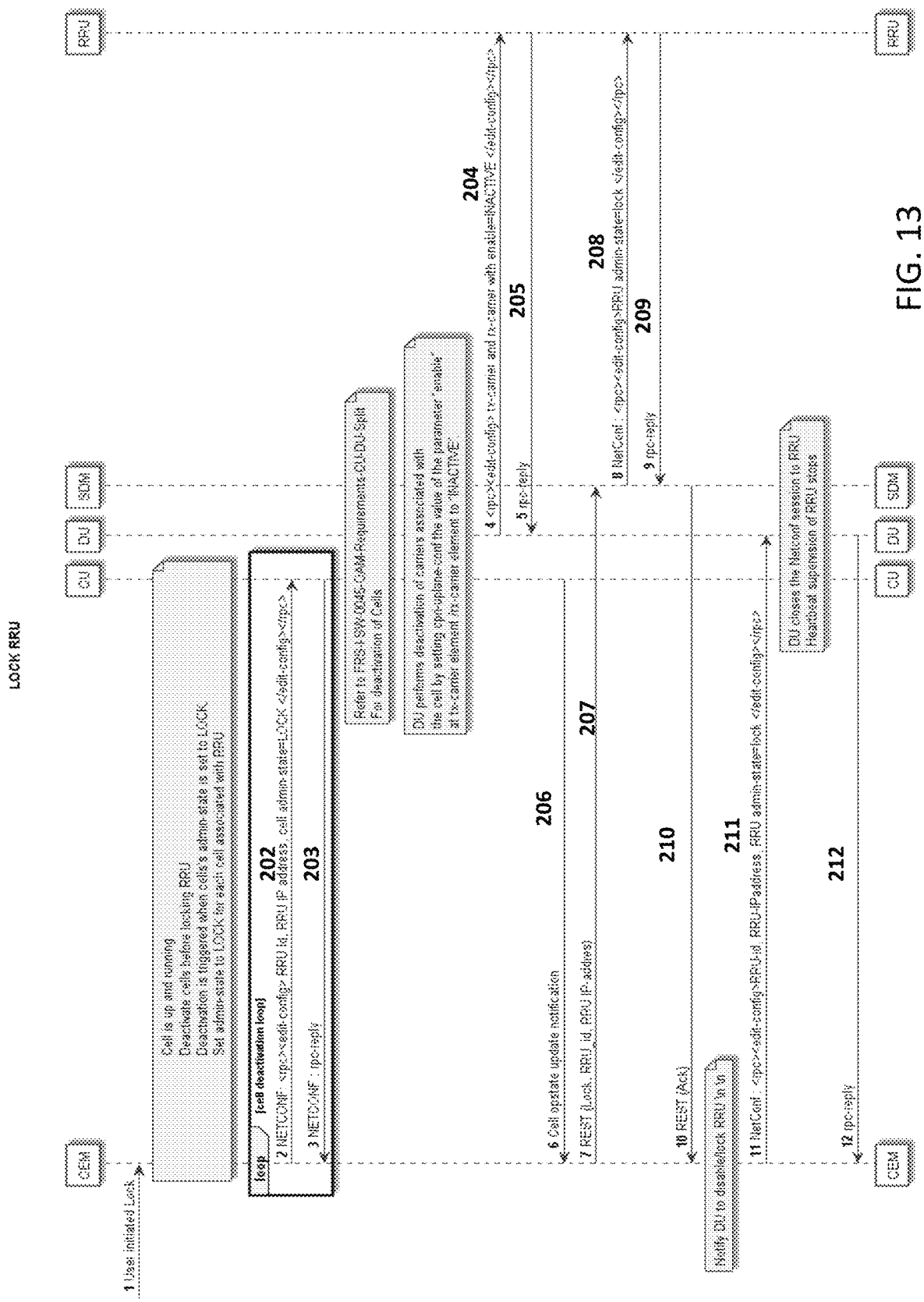
FIG. 13 is a flowchart illustrating a message sequence for an RRU Lock Sequence.

In the embodiment of FIG. 13 is a flow chart and message sequence for an RRU 105 Lock. As shown in FIG. 13, the lock operation on RRU 105 is three step operation.

1) Deactivate cells associated with RRU 105 by setting the admin-state of the cell to LOCK. CEM is configured to LOCK all the cells associated with RRU. The CU handles deactivation/disabling of affected cell by interacting with DU 104 and RU.
2) DU performs deactivation of cells by changing configuration of the cpri-uplane-config for the RRU 105 by setting the value of the parameter 'enable" for tx-carrier element and rx-carrier element to "DISABLED" for all the carriers associated with RRU.
3) CEM sends lock request to the RRU 105 and the RRU 105 updates the admin-state of the RRU 105 to locked.

At block 201, a user-initiated lock is sent to the CEM. Where the cells are up and running, cells are deactivated before locking RRU 105. Deactivation is triggered when cells's admin-state is set to LOCK. Accordingly, an admin-state is set to LOCK for each cell associated with RRU 105. Blocks 202-203 show a deactivation loop for a cell. At block 202, the CEM sends an admin lock state to the CU (NETCONF: <rpc><edit-config> RRU Id, RRU IP address, cell admin-state=LOCK </edit-config></rpc>). At block 203 the CU sends a reply message to the CEM (NETCONF: rpc-reply). A protocol for deactivation of cells is given in XRAN Management Plane Specification, 2018.12.13-XRAN-FH.MP.2.0, the entirety of which is incorporated by reference hereby. At block 204, the DU 104 sends a message to the RRU 105 to perform deactivation of carriers associated with the cell by setting a cpri-uplane-conf the value of the parameter "enable" at tx-carrier element/rx-carrier element to "INACTIVE" (<rpc><edit-config> tx-carrier and rx-carrier with enable=INACTIVE </edit-config></rpc>). At block 205, the RRU 105 sends a reply to the DU 104 (rpc-reply). At block 206 the CU sends the CEM a cell operation state update notification. At block 207 the CEM sends a Lock message to the SDM (REST (Lock, RRU_id, RRU IP-address). At block 208 the SDM sends an administration lock state to the RRU 105 (NetConf: <rpc><edit-config>RRU admin-state=lock </edit-config></rpc>). At block 209, the RRU 105 sends a reply to the SDM (rpc-reply). At block 210 the SDM send the CEM a REST acknowledgment.

At block 211, CEM notifies the DU 104 to disable/lock the RRU 105 (NetConf: <rpc><edit-config>RRU-id, RRU-IPaddress, RRU admin-state=lock </edit-config></rpc>), and at block 212 the DU 104 returns a reply to the CEM. The DU 104 then closes the Netconf session to the RRU 105 and heartbeat supervision of the RRU 105 stops.

Unlock RRU

Figure 14:
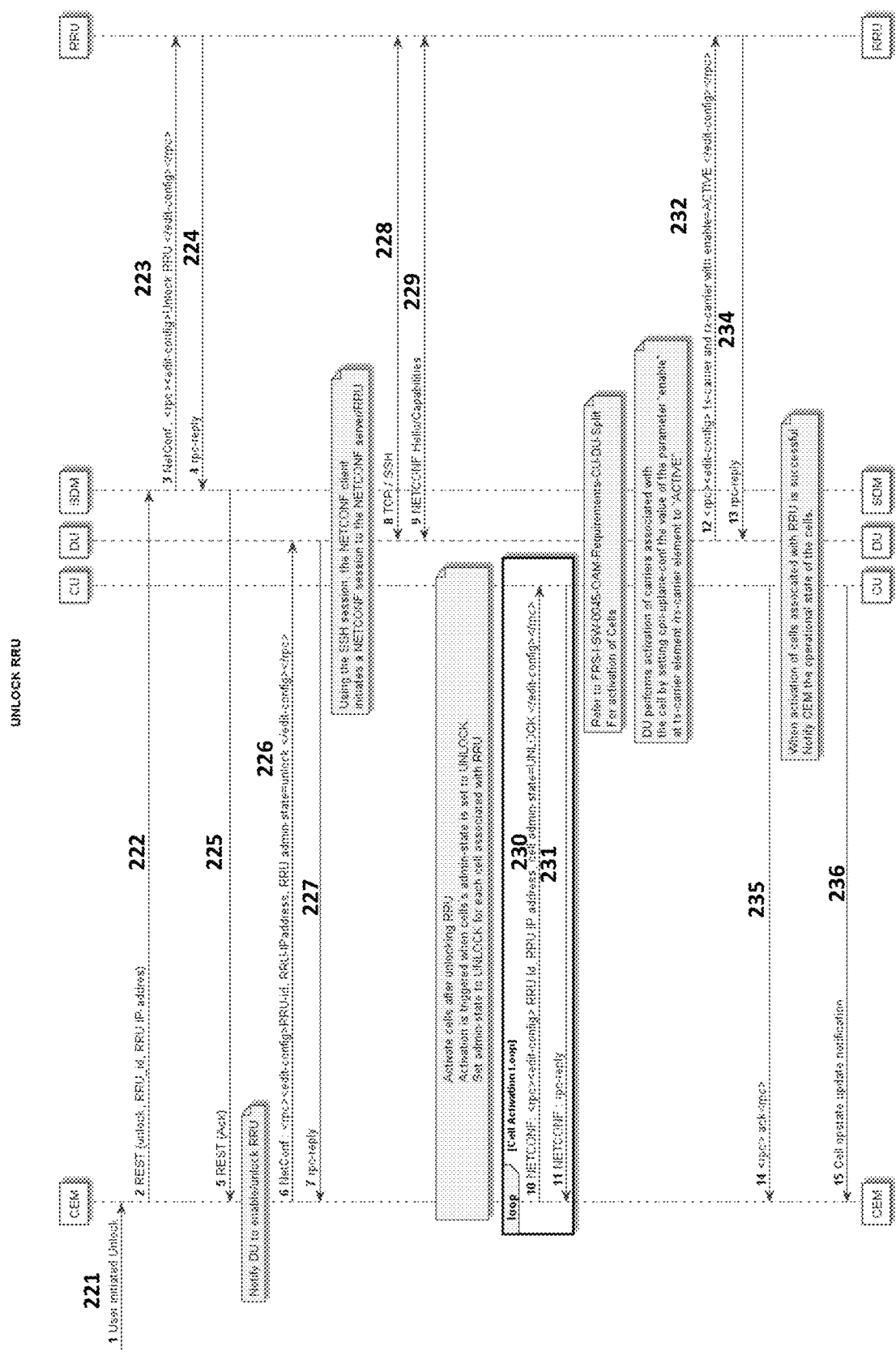
FIG. 14 is a flowchart illustrating a message sequence for an RRU Unlock Sequence

In the embodiment FIG. 14 is a flow chart and message sequence for an RRU 105 Unlock Sequence. For the unlock of RRU.

1. CEM is configured to send unlock request to the RRU 105 and update the admin-state to unlocked.
2. Activate cells associated with the RRU 105 by setting the admin-state of the cell to UNLOCK. CEM is configured to UNLOCK all the cells associated with RRU. Refer to reference XRAN Management Specification, 2018.12.13-XRAN-FH.MP.2.0.0, the entirety of which is incorporated by reference hereby, for activation of a cell. CU is configured to handle activation/enabling of affected cell by interacting with DU/RU.
3. DU performs activation of the RRU 105 cells by changing configuration of cpri-uplane-config for the RRU 105 by setting the value of the parameter 'enable" for at tx-carrier element and rx-carrier element to "ENABLED" for all the carriers associated with RRU.

At block 221, the CEM receives a user initiated unlock message. At block 222 the CEM sends the SDM an RRU 105 unlock request (REST (unlock, RRU_id, RRU IP-address)). At block 223 the SDM sends the RRU 105 an unlock message (NetConf: <rpc><edit-config>Unlock RRU </edit-config></rpc>). At block 224 the RRU 105 sends the SDM a reply, which the SDM acknowledges to the CEM at block 225.

At block 226, the CU notifies the DU to enable/unlock RRU 105 (NetConf: <rpc><edit-config>RRU-id, RRU-IP-address, RRU admin-state=unlock </edit-config></rpc>), and at block 227 the DU 104 sends a reply to the CEM. At block 228, the NETCONF client initiates a NETCONF session to the NETCONF server/RRU using the SSH session (DU<->RRU: TCP/SSH). At block 229, the DU 104 and the RRU 105 confirms the NETCONF session (NETCONF Hello/Capabilities).

At blocks 230-231, the cells are activated after unlocking RRU. Activation is triggered when cells's admin-state is set to UNLOCK. Blocks 230-231 show a cell activation loop. The admin-state for each cell is set to UNLOCK for each cell associated with RRU. At block 230, the CEM sends the CU an unlock cell administration message (NETCONF: <rpc><edit-config>RRU Id, RRU IP address, cell admin-state=UNLOCK </edit-config></rpc>, and at block 231 the CU sends a reply to the CEM:(NETCONF: rpc-reply).

A protocol for activation is found XRAN Management Specification, 2018.12.13-XRAN-FH.MP.2.0.0, the entirety of which is incorporated by reference herein.

At block 232, the DU 104 sends a message to the RRU 105 to perform activation of carriers associated with the cell by setting cpri-uplane-conf the value of the parameter "enable" at tx-carrier element/rx-carrier element to "ACTIVE": (<rpc><edit-config> tx-carrier and rx-carrier with enable=ACTIVE </edit-config></rpc>). At block 233, the RRU 105 sends the DU 104 a reply, and at block 234 the CU send the CEM an acknowledgement message. At block 234, when activation of cells associated with the RRU 105 is successful, CU notifies the CEM of the operational state of the cells (Cell opstate update notification).

RRU Failure

Figure 15A:
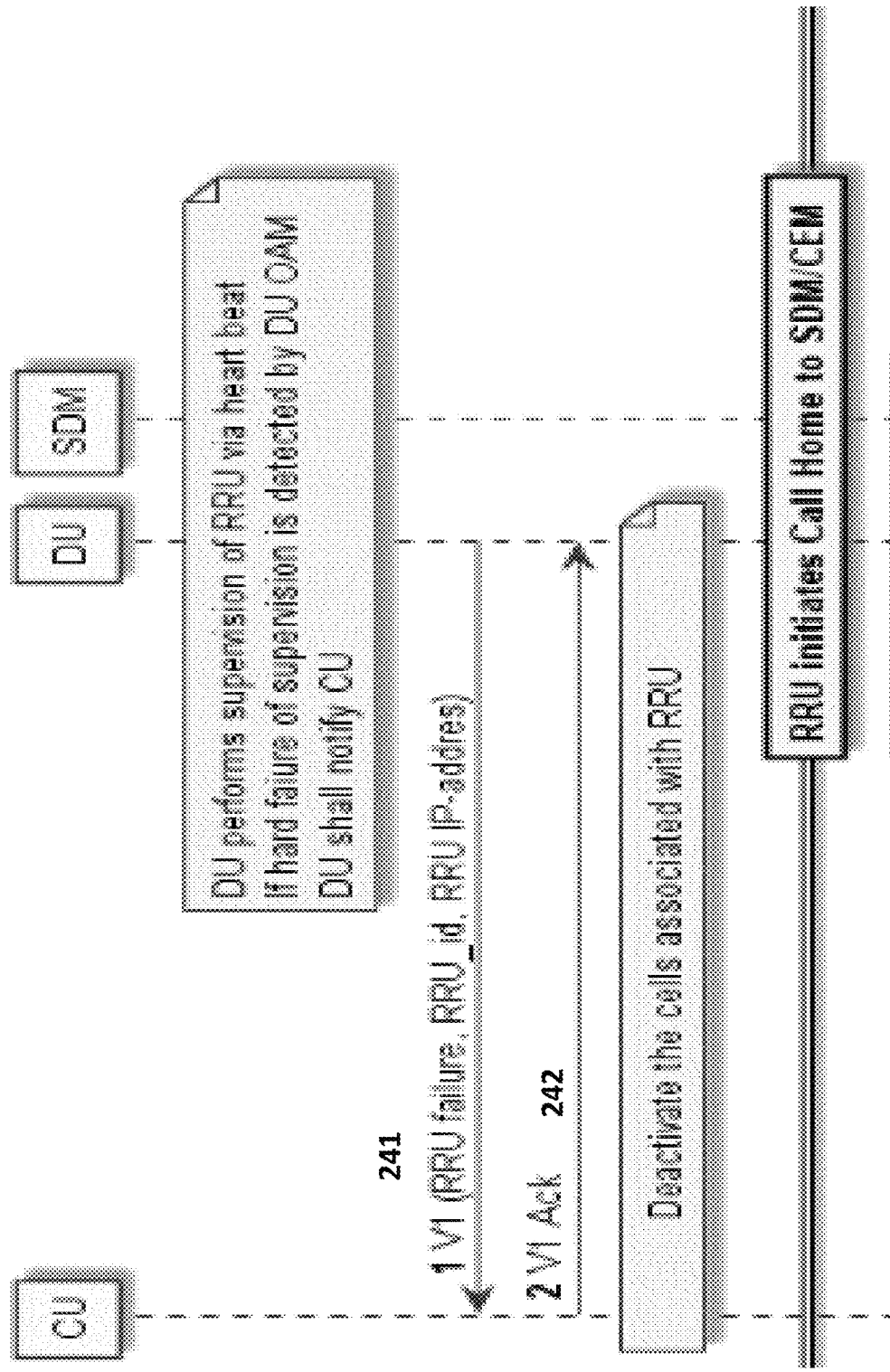
FIGS. 15A-15C are flowcharts illustrating a message sequence for an RRU failure.
Figure 15B:
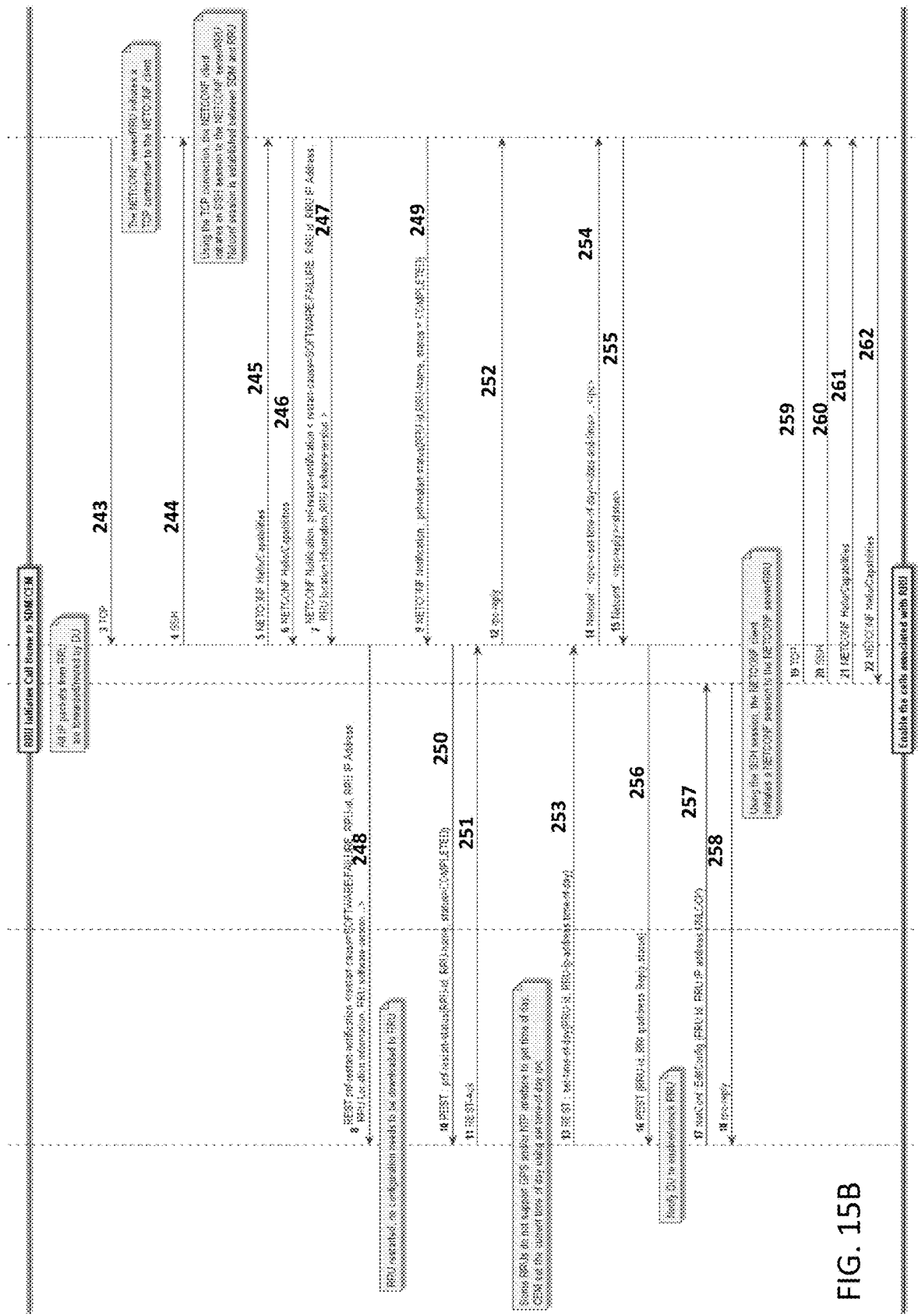
Figure 15C:
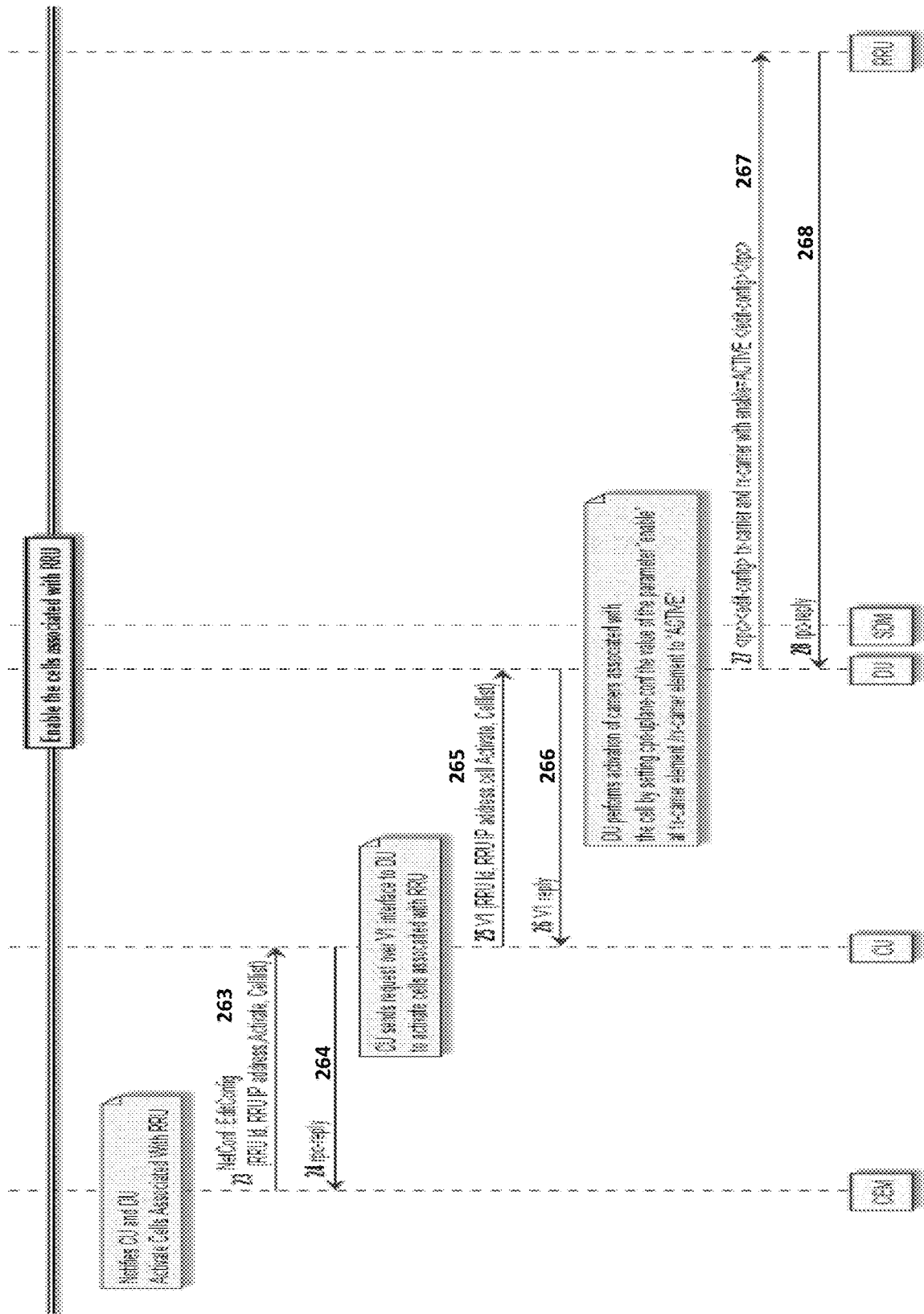

In an embodiment, FIGS. 15A-15C illustrate a flow chart and message sequence for an RRU 105 failure. The DU OAM module 108 is configured to detect the failure of the RRU 105 when the supervision failure is detected. The DU OAM module 108 is configured to notify Layer 2 application in DU 104. The DU 104 is configured to send the RRU

105 failure notification to CU if the failure is persistent. CU is configured to trigger deactivation of the cells associated with RRU 105.

The DU 104 performs supervision of the RRU 105 via heartbeat functionality. If hard failure of supervision is detected by the DU OAM module 108, the DU 104 is configured to notify CU. At block 241 the DU 104 sends the CU a failure message via a V1 interface ((RRU failure, RRU_id, RRU IP-address)), which the CU acknowledges at block 242. This Deactivates the cells associated with RRU.

In an embodiment, the RRU 105 initiates a call home the the SDM/CEM. All IP packets from the RRU 105 are forwarded/routed by the DU 104. At 243, the RRU 105 sends a TCP message to the SDM and the NETCONF server at the RRU 105 initiates a TCP connection to the NETCONF client. At block 244, the NETCONF client initiates an SSH session to the NETCONF server/RRU using the TCP connection. At blocks 245-246 the Netconf session is established between SDM and RRU 105 (handshake NETCONF Hello/Capabilities). At block 247, the RRU 105 sends a restart message for software failure to the SDM (NETCONF Notification: pnf-restart-notification <restart-cause=SOFTWARE-FAILURE, RRU id, RRU IP Address, \n RRU location information, RRU software-version>). At block 248, the SDM-sends the restart message to the CEM (REST pnf-restart-notification <restart-cause=SOFTWARE-FAILURE, RRU-id, RRU IP Address, \n RRU Location information, RRU software-version . . . >). Once the RRU 105 is restarted, no configuration needs to be downloaded to RRU.

At block 249, the RRU 105 sends the SDM a: NETCONF Notification that the restart is completed (pnf-restart-status (RRU-id, RRU-Name, status=COMPLETED). At block 250, the SDM forwards the restart complete message to the CEM (REST: pnf-restart-status (RRU-id, RRU-name, status=COMPLETED)), which the CEM acknowledges to the SDM at block 251. At block 252, the SDM sends the RRU 105 the reply.

As noted above, as some RRUs 105-*n* do not support GPS and/or NTP interface to get time of day, the CEM can set the current time of day using a set-time-of-day rpc. At block 253, the CEM can send to the SDM a REST: set-time-of-day message ((RRU-id, RRU-ip-address, time-of-day). At block 254, the SDM sends the time of day message to the RRU 105 (Netconf: <rpc><set-time-of-day><date-and-time> . . . <rpc>). At block 255, the RRU 105 sends to the SDM a Netconf reply status message (Netconf: <rpc-reply><status>), and at block 256, the SDM sends the reply status and RRU 105 information to the CEM (REST (RRU-id, RRI-ipaddress, Reply, status)). At block 257, the CEM notifies DU 104 to enable/unlock the RRU 105 (NetConf: EditConfig \n (RRU Id, RRU IP address, UNLOCK)). At block 258, the DU 104 sends an rpc-reply to the CEM. At block 259, using the SSH session, the NETCONF client of the DU 104 initiates a NETCONF session to the NETCONF server at the RRU. At block 259, the DU 104 sends at TCP message to the RRU, and at block 260 the DU 104 sends the SSH message to the RRU. At block 262, the DU 104 sends a message confirming NETCONF capabilities to the RRU 105 (NETCONF Hello/Capabilities) and at block 262 the RRU 105 confirms the handshake with the DU 104 (NETCONF Hello/Capabilities).

As shown in FIG. 15C, the system is configured to enable the cells associated with RRU. At blocks 263-268 the CEM notifies CU and DU 104 to activate cells associated with the RRU. At block 263 the CEM sends an active cell list message to the CU (NetConf:EditConfig \n (RRU Id, RRU IP address, Activate, Celllist)), and at block 264 the CU sends a reply message to the CEM (rpc-reply). At block 265 the CU sends the request over a V1 interface to DU 104 to activate cells associated with RRU 105 (V1: (RRU Id, RRU IP address, Activate, Celllist). At block 266 the DU 104 sends to the reply to the CU over the V1 interface. At block 267 the DU 104 sends an activation message to the RRU 105 to perform activation of carriers associated with the cell by setting cpri-uplane-conf the value of the parameter "enable" at tx-carrier element/rx-carrier element to "ACTIVE" (<rpc><edit-config> tx-carrier and rx-carrier with enable=ACTIVE </edit-config></rpc>). At block 268, the RRU 105 sends a reply to the DU 104 (rpc-reply).

Delete RRU

In an embodiment, the following steps can be performed to delete the RRU.

a) Deactivate all the cells associated with the RRU 105 by sending admin-state=LOCK for all the cells associated with the RRU 105.

b) Lock the RRU. Details covered in this FRS. Cells associated with the RRU 105 have to be deactivated as part of locking the RRU 105 and interactions with CU and DU 104 are covered in reference XRAN Management Specification, 2018.12.13-XRAN-FH.MP.2.0.0, the entirety of which is incorporated by reference hereby.

c) CEM is configured to clear any alarms associated with the RRU.

d) CEM is configured to remove the association with the DU 104 in the topology and remove configuration related to RRU.

RRU S/W Download, Install, and Activate Message Sequence

Figure 16A:
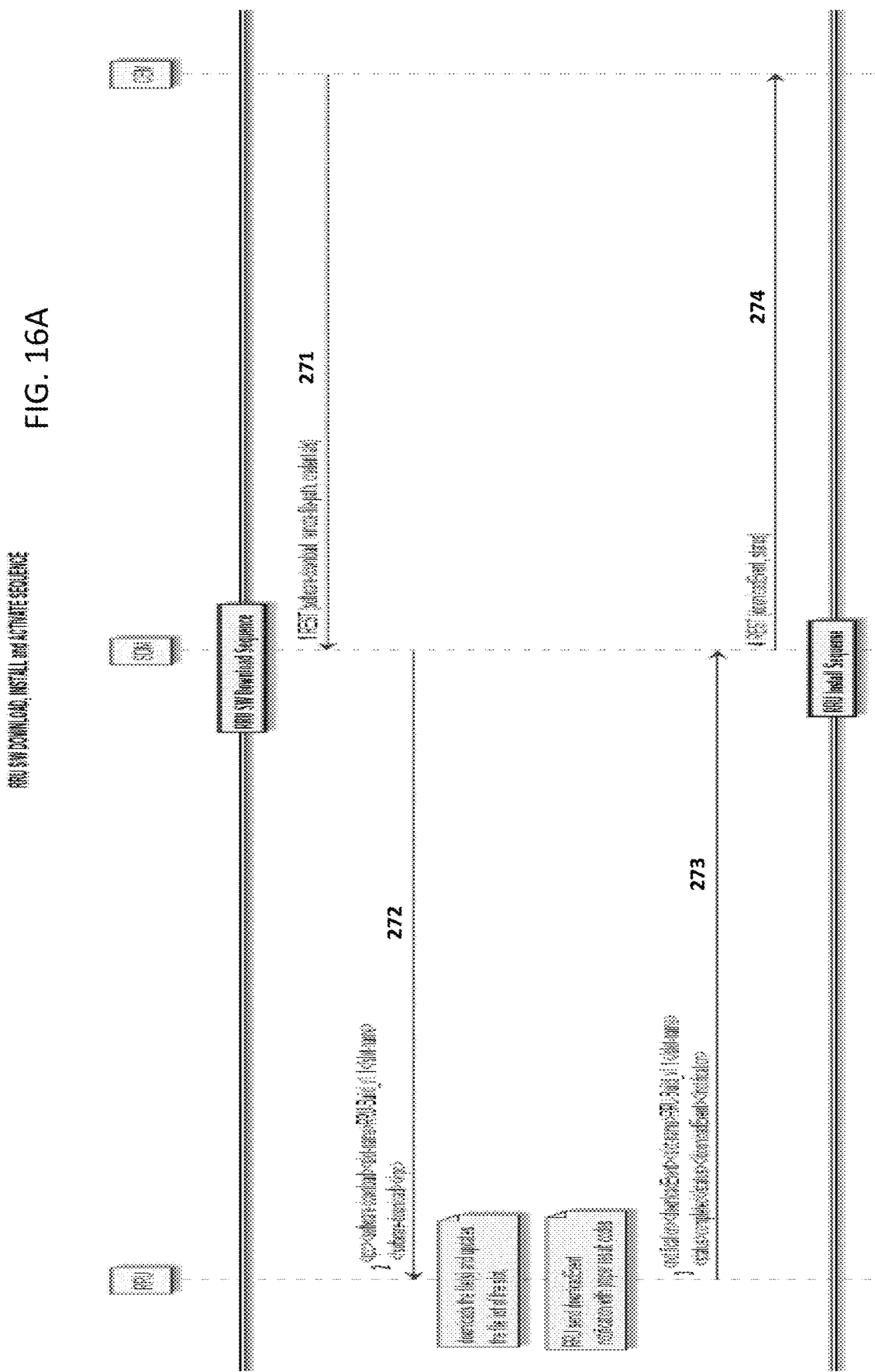
FIGS. 16A-16C are flowcharts illustrating a message sequence for an RRU software download, install and activation.
Figure 16B:
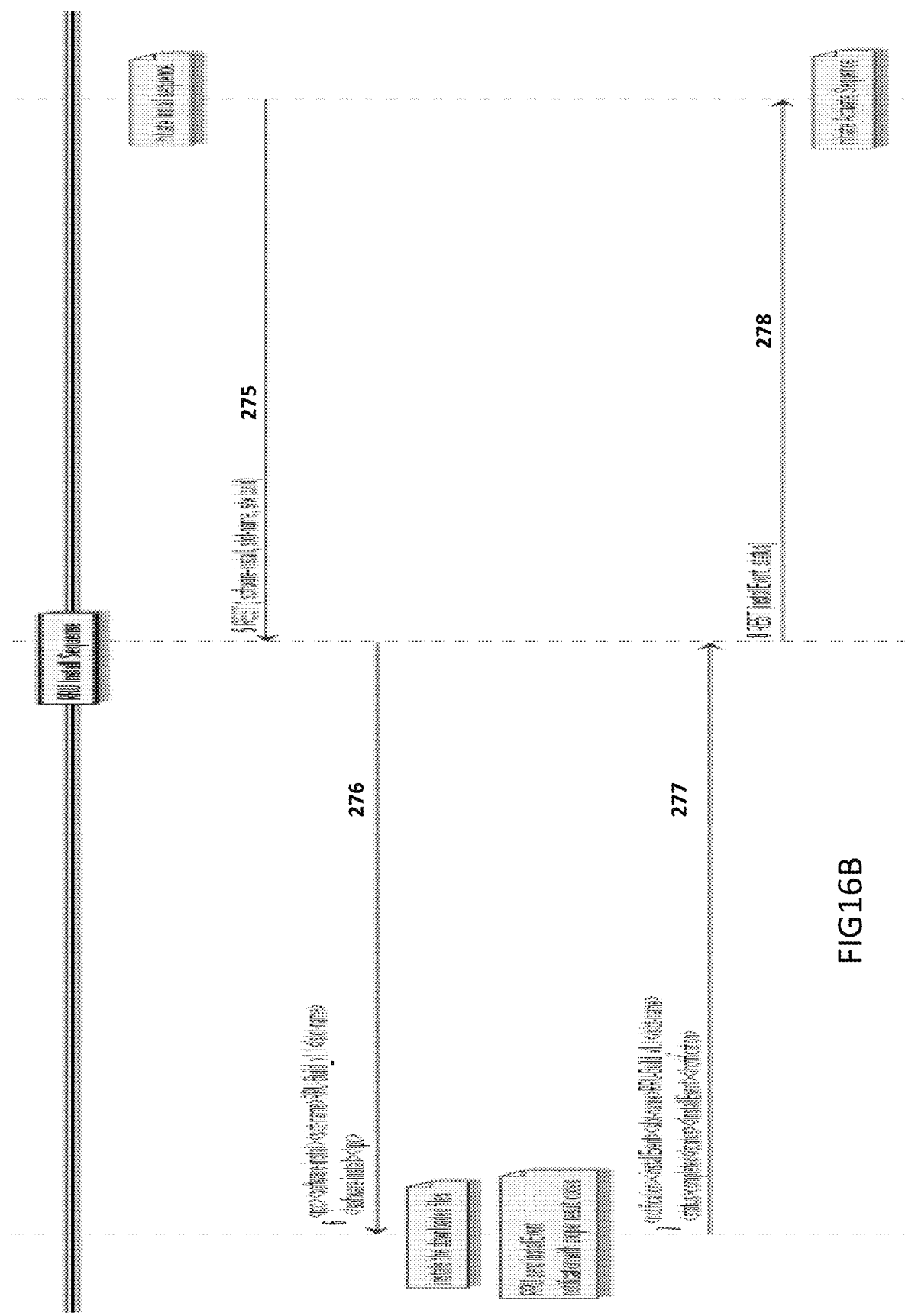
Figure 16C:
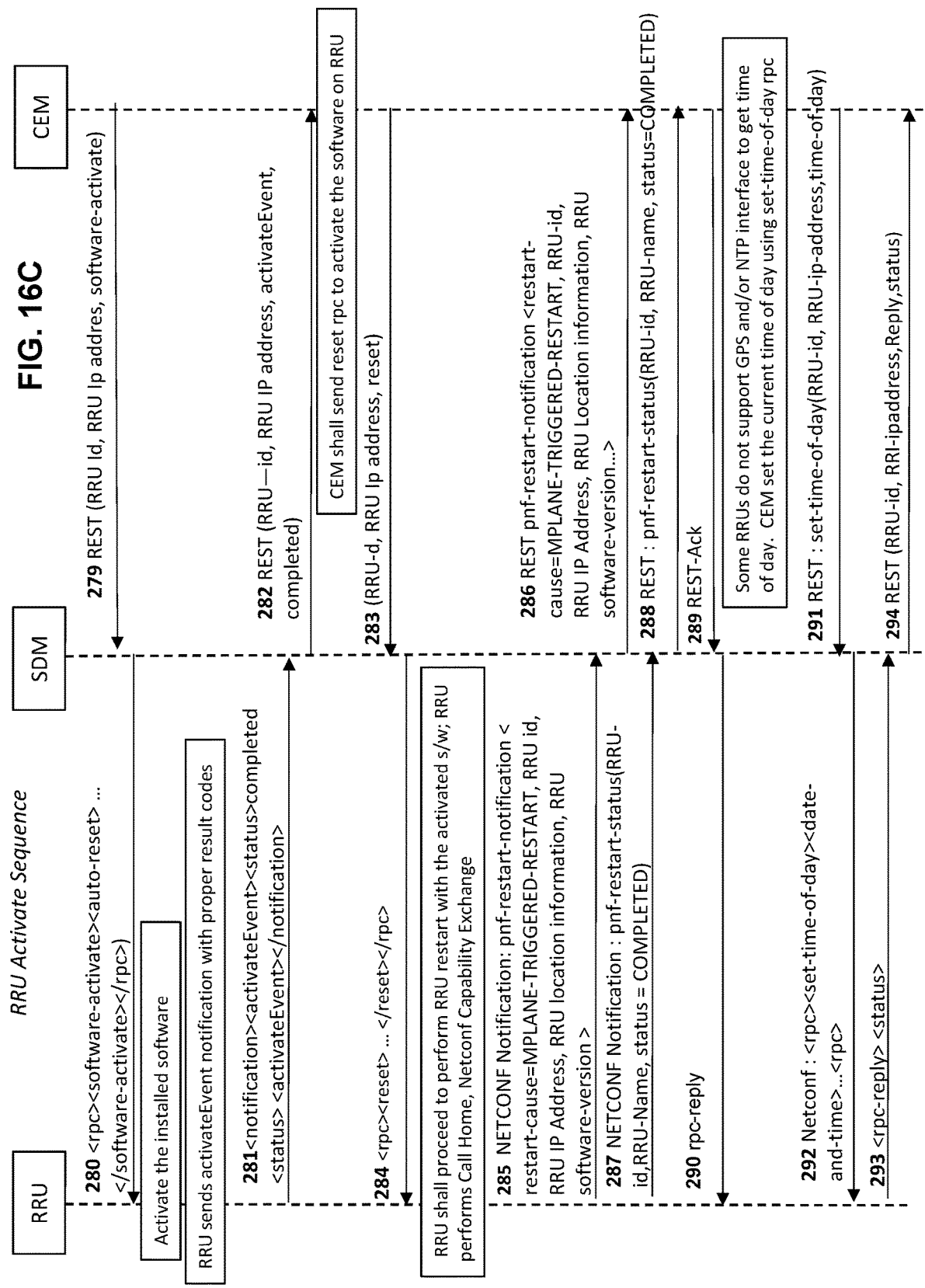

FIGS. 16A-16C are flowcharts illustrating a message sequence for an RRU 105 Software (S/W) Download, Install and Activation.

At block 271, the CEM sends a REST connection to the SDM for a software download (REST (software-download, remote-file-path, credentials)).

At block 272, the RRU gets the software inventory from SDM. The RRU 105 is configured to create a software-slot using edit-config function if a software-slot is not available. At block 272, CEM/SDM sends the download request to the RRU 105 specifying the remote location of the software files to be downloaded (SDM→RRU: <rpc><software-download><slot-name>RRU-Build_v1.1</slot-name>\n </software-download></rpc>). The RRU 105 responds to the download request and downloads the file(s) and updates file list of the slot. At block 273, once the RRU 105 downloads the files from remote file server and sends the notification to SDM once it has completed downloading the files with the proper result codes At block 274, the SDM then informs the CEM of the event completion.

FIG. 16B shows an RRU 105 Install Sequence. At block 275, the CEM initiates the install sequence. The CEM send the SDM a REST connection to install the software in the slot. At block 276 the SDM send the installation message to the RRU 105 (<rpc><software-install><slot-name>RRU-Build_v1.1</slot-name>\n </software-install></rpc>). At block 277, the RRU 105 installs the downloaded files, and at block 278 sends a notification of the installation to the SME with the proper result codes.

FIG. 16C shows a software activation sequence for the RRU. At block 279 the CEM sends a REST connection to initiate an RRU 105 activate sequence (REST (RRU Id, RRU Ip address, software-activate)). At block 280, the SDM sends a software activation message to the RRU. At block 281, the RRU 105 activates the installed software and sends a notification to the SDM that the installation is complete along with proper result codes. At block 282, the SDM sends the CEM a REST message including the notification that the RRU 105 has activated the software along with the RRU 105 identification and IP address.

At block 283, CEM sends the SDM a reset message to reset and activate the software on RRU. At block 284 the SDM relays the reset message to the RRU. At block 285, the RRU 105 proceeds to perform the RRU 105 restart with the software, and then sends a confirmation message that the software is activated and the RRU 105 is Netconf capable. At block 286, the SDM forwards the confirmation to the CEM along with the RRU 105 location, IP address and software version information. At block 287, the RRU 105 sends the SDM a NETCONF notification that the restart is completed. At block 288, the SDM forwards the message to the CEM along with the RRU 105 identification information. At block 289, the CEM acknowledges the message the SDM, and at block 290 the SDM sends and rpc reply to the RRU.

As noted herein, as some RRUs 105-*n* do not support GPS and/or NTP interface to get time of day, the CEM can set the current time of day using set-time-of-day rpc. At block 290, the CEM can send to the SDM a REST: set-time-of-day message ((RRU-id, RRU-ip-address, time-of-day). At block 291, the SDM sends the time of day message to the RRU 105 (Netconf: <rpc><set-time-of-day><date-and-time> . . . <rpc>). At block 292, the RRU 105 sends to the SDM a Netconf reply status message (Netconf: <rpc-reply><status>). At block 293, the SDM sends the reply status and RRU 105 information to the CEM (REST (RRU-id, RRI-ipaddress, Reply, status)).

Active Cell on RRU

Figure 17:
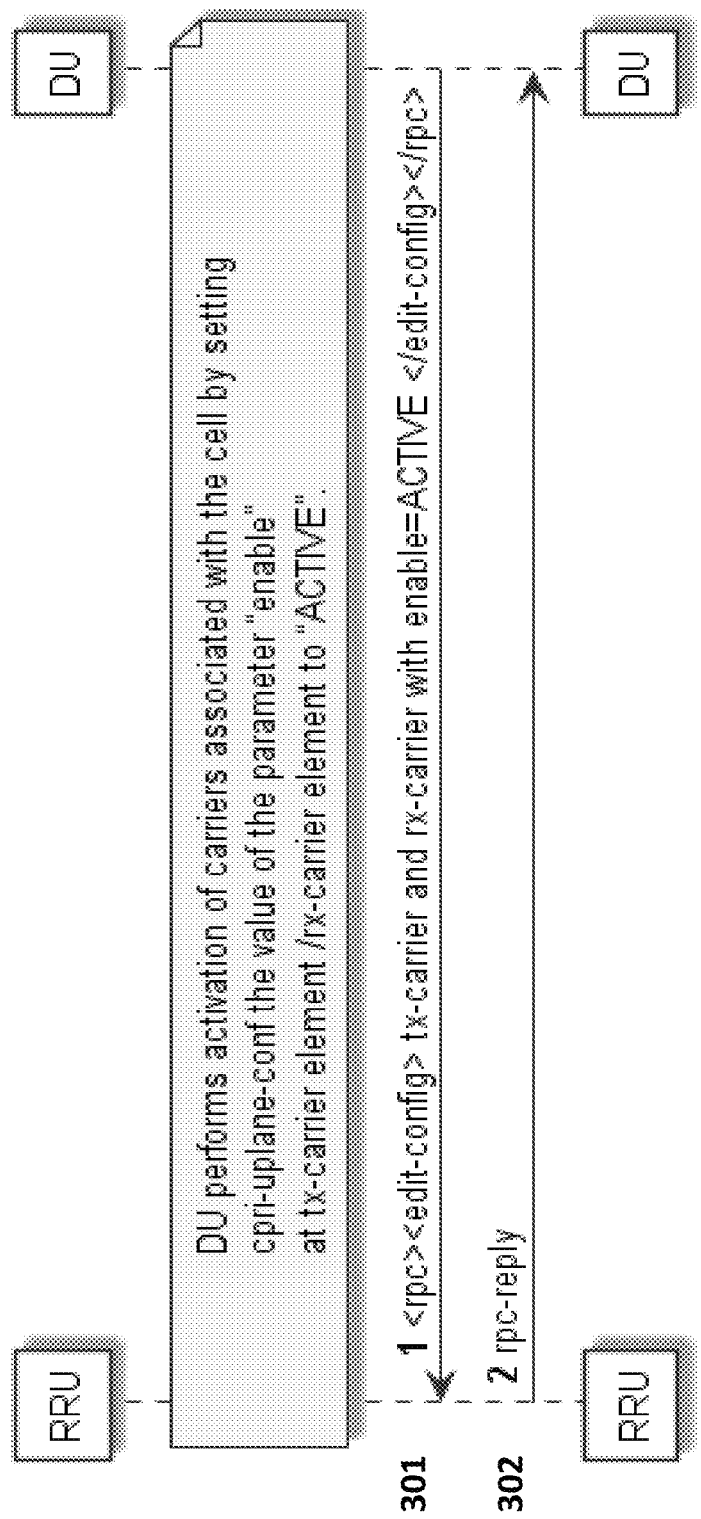
FIG. 17 is a flowchart illustrating a message sequence to activate a cell on an RRU.

In an embodiment, FIG. 17 illustrates a flowchart and message sequence to activate a cell on an RRU. As shown, at blocks 301-302 the DU 104 performs activation of the carriers associated with the cell. At block 301, the DU 104 sets the admin-state of tx-carriers and rx-carriers is set to enable=ACTIVE. At block 302, the RRU 105 sends a reply message radiates on the cell.

Deactivate Cell on RRU

Figure 18:
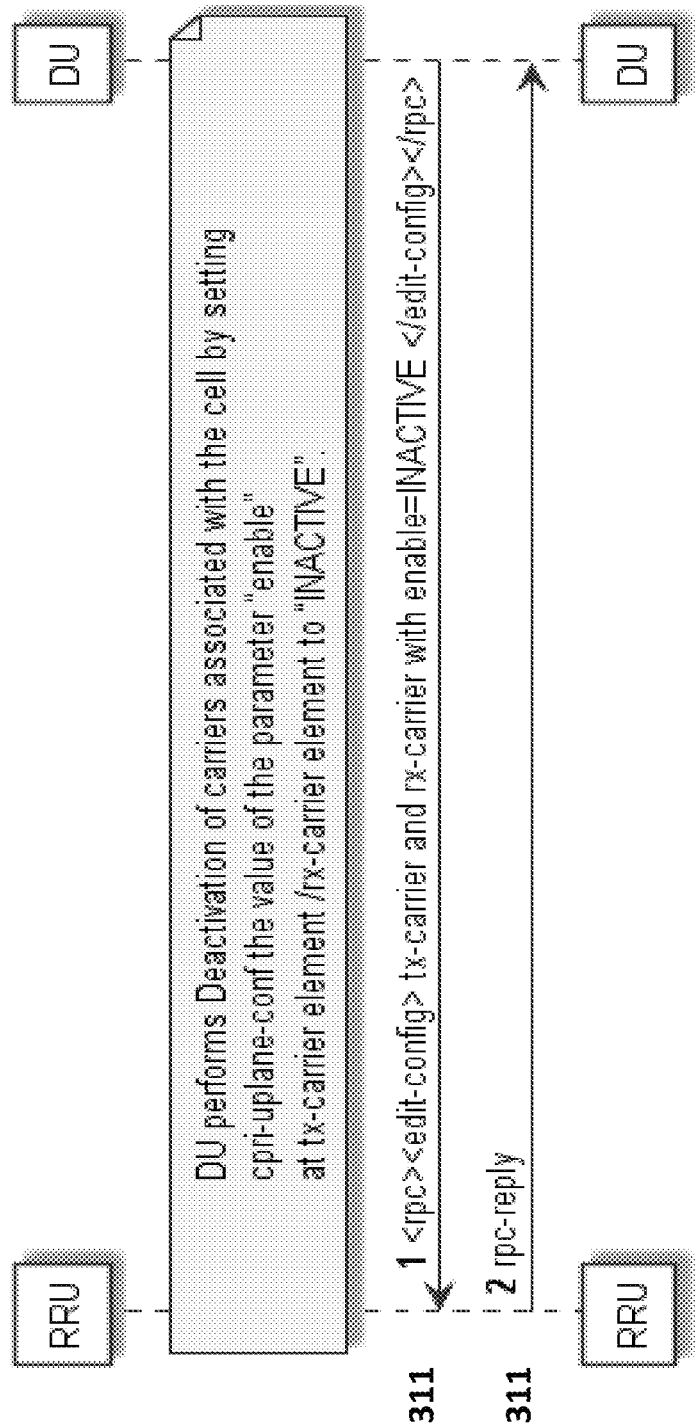
FIG. 18 is a flowchart illustrating a message sequence to deactivate a cell on an RRU.

The embodiment of FIG. 18 illustrates a flow chart and message sequence for deactivating an RRU 105 cell. As shown at blocks 311-312 the DU 104 performs activation of the carriers associated with the cell, the admin-state of tx-carriers and rx-carriers is set to enable=INACTIVE. At block 312, RRU 105 sends a reply message stops radiating on this cell.

It will be understood that each operation block of the illustrated flowchart, and combinations of operation blocks in the flowcharts, can be implemented by computer program instructions. These program instructions can be provided to a processor to produce a machine, such that the instructions, which execute on the processor, create means for implementing the actions specified in the flowchart operation block or operation blocks. The computer program instructions can be executed by a processor to cause a series of operational steps to be performed by the processor to produce a computer-implemented process such that the instructions execute on the processor to provide steps for implementing the actions specified in the flowcharts' operation block or operation blocks. The computer program instructions can also cause at least some operational steps shown in the operation blocks of the flowcharts to be performed in parallel. Moreover, some steps can also be performed across more than one processor, such as in a multi-processor computer system or even a group of multiple computer systems. In addition, one or more operation blocks or combinations of operation blocks in the flowcharts can also be performed concurrently with other operation blocks or combinations of operation blocks.

Accordingly, operation blocks of the illustrated flowcharts support combinations for performing the specified actions, combinations of steps for performing the specified actions and program instruction for performing the specified actions. It will also be understood that each operation block of the flowcharts, and combinations of operation blocks in the flowchart, can be implemented by special purpose hardware-based systems, which perform the specified actions or steps, or combinations of special purpose hardware and computer instructions. The foregoing example should not be construed as limiting and/or exhaustive.

The embodiments described herein are exemplary and should not be construed as implying any particular limitation on the present disclosure. It is understood by those skilled in the art that various modifications, combinations, sub-combinations and alterations may occur depending on design requirements and other factors insofar as they are within the scope of the present disclosure.

Third Generation Partnership Project (3GPP) and Internet Engineering Task Force (IETF) technology standards, requests for comments, reports and papers referred to herein, and the entirety of each of which are incorporated by reference herein:

[TR 21.905] Vocabulary for 3GPP Specifications (version 14.1.1 Release 14).

IETF RFC 6020 YANG—A Data Modeling Language for the Network Configuration Protocol (NETCONF) October 2010.

IETF RFC 6241: Network Configuration Protocol (NETCONF), June 2011.

IETF RFC 8071: NETCONF, Call Home and RESTCONF Call Home, February 2017.

Common Public Radio Interface (CPRI); Interface Specification; V7.0 (2015-10-09).

XRAN Management Specification, 2018.12.13-XRAN-FH.MP.2.0.0.

The invention claimed is:

1. A system comprising:
   a Network Management System (NMS) Server comprising an NMS Network Configuration Protocol (NETCONF) Client;
   a Distributed Unit (DU) comprising a DU NETCONF Server, a DU NETCONF Client module, and a DU Operation Administration and Maintenance (OAM) module; and
   one or more Remote Radio Units (RRU), each comprising a NETCONF Server and associated as a child node to the Distributed Unit as a parent node,
   wherein the NMS NETCONF Client of the NMS Server is configured to network with the DU NETCONF Server and each of the one or more RRU NETCONF Servers, and
   wherein the NMS OAM module is configured to interface the DU NETCONF Server and the DU NETCONF Client of the DU to manage a NETCONF interface between the RRU and the NMS.

2. The system of claim 1, further comprising:
   wherein the RRU comprises an RRU OAM Module, and wherein the DU OAM module is configured to interface with the RRU OAM module to provide a data connection between the DU and the RRU.

3. The system of claim 2, further comprising:
a CPRI Adapter comprising a CPRI OAM module;
wherein the CPRI OAM module is configured to interface the DU OAM module with the RRU OAM module.

4. The system of claim 1, further comprising:
a Central Unit (CU) connected to the DU; and
a DHCP Server connected to the DU.

5. The system of claim 1, wherein the NETCONF interface comprises at least one of:
a fault management interface;
a software management interface;
a configuration management interface; and
a performance management interface.

6. The system of claim 1, wherein the RRU NETCONF Server is configured to interface with the NMS NETCONF Client.

7. The system of claim 5, wherein:
the NECONF interface between the NMS NETCONF Client and the DU NETCONF Server is the configuration management interface between the NMS Server and the DU; and
the NETCONF interface between the DU NETCONF Client and the RRU NETCONF Server is the configuration management interface between the DU and the RRU.

8. The system of claim 7, further comprising at least one of:
a software management interface between the NMS NETCONF Client and the RRU NETCONF Server;
a fault management interface between the NMS NETCONF Client and the RRU NETCONF Server; and
a performance management interface between the NMS NETCONF Client and the RRU NETCONF Server.

9. The system of claim 7, further comprising:
a fault management interface between the DU NETCONF Client and the RRU NETCONF Server.

10. The system of claim 1, wherein:
the NMS Server comprising a Central Element Management (CEM) and a Smart Deployment Manager (SDM), and wherein the SDM includes the NMS NETCONF Client.

11. A method comprising:
establishing a Network Configuration Protocol (NETCONF) interface between a Network Management System (NMS) Server, the NMS Server comprising an NMS Network NETCONF Client and a Distributed Unit (DU) comprising a DU NETCONF Server, a DU NETCONF Client, and a DU Operation Administration and Maintenance OAM module;
establishing a NETCONF interface between one or more Remote Radio Units (RRU) and the DU, each RRU comprising an RRU NETCONF Server associated as a child node to the Distributed Unit as a parent node,
wherein the NMS NETCONF Client of the NMS Server is configured to network with the DU NETCONF Server of the DU and each of the DU NETCONF Server RRU components; and
wherein the NMS OAM module is configured to interface the DU NETCONF Server and the DU NETCONF Client of the DU to manage NETCONF interfaces between the RRU and the Network Management System.

12. The method of claim 11, wherein the establishing of the NETCONF interface between the NMS and the RRU comprises:
establishing a transport layer between the one or more Remote Radio Unit (RRU) components and the NMS via the DU; and
establishing the NETCONF interface between the NMS NETCONF Client and the RRU NETCONF Server.

13. The method of claim 11, further comprising:
downloading software to the RRU from the NMS via the NETCONF interface.

14. The method of claim 13, further comprising a method for performing the software upgrade for the RRU that comprises:
downloading the software from the NMS to the RRU;
installing the software on the RRU; and
activating the software on the RRU.

15. The method of claim 11, further comprising:
activating the RRU and unlocking one or more cells associated with the with the NMS.

16. The method of claim 11, further comprising:
performing a software upgrade for the RRU from the NMS via the NETCONF interface between the NMS.

17. The method of claim 16, wherein the method for performing the software upgrade for the RRU comprises:
downloading the software upgrade from the NMS to the RRU;
installing the software on the RRU; and
activating the upgraded software on the RRU.

18. The method of claim 11, further comprising:
locking or unlocking the RRU, wherein the NMS is configured to lock or unlock the RRU via the DU.

19. The method of claim 11, further comprising at least one of:
performing software management via the interface between the NMS NETCONF Client and the RRU NETCONF Server; and
performing fault management via interface between the NMS NETCONF Client and the RRU NETCONF Server.

20. The method of claim 11, further comprising:
establishing a first NECONF configuration management interface between the NMS NETCONF Client and the DU NETCONF Server; and
establishing a second NETCONF configuration management interface between the DU NETCONF Client and the RRU NETCONF Server.

* * * * *